(12) United States Patent
Barman et al.

(10) Patent No.: US 8,145,719 B2
(45) Date of Patent: Mar. 27, 2012

(54) METHOD AND SYSTEM FOR MESSAGING AND COMMUNICATION BASED ON GROUPS

(75) Inventors: Touradj Barman, San Diego, CA (US); Kristofer Fox, El Segundo, CA (US)

(73) Assignee: GoGroups, San Diego, CA (US)

( * ) Notice: Subject to any disclaimer, the term of this patent is extended or adjusted under 35 U.S.C. 154(b) by 931 days.

(21) Appl. No.: 11/681,507

(22) Filed: Mar. 2, 2007

(65) Prior Publication Data
US 2007/0208802 A1  Sep. 6, 2007

Related U.S. Application Data

(60) Provisional application No. 60/778,609, filed on Mar. 3, 2006.

(51) Int. Cl.
*G06F 15/16* (2006.01)
(52) U.S. Cl. .......... 709/206; 709/227
(58) Field of Classification Search .......... 709/217, 709/204–206, 223–229
See application file for complete search history.

(56) References Cited

U.S. PATENT DOCUMENTS

| | | | | |
|---|---|---|---|---|
| 5,919,247 A * | 7/1999 | Van Hoff et al. | ............. | 709/217 |
| 6,353,926 B1 * | 3/2002 | Parthesarathy et al. | ....... | 717/170 |
| 7,000,230 B1 * | 2/2006 | Murray et al. | ................. | 717/172 |
| 7,260,632 B2 * | 8/2007 | Shaffer et al. | ................. | 709/224 |
| 2002/0026495 A1 * | 2/2002 | Arteaga | ........................ | 709/217 |
| 2003/0055911 A1 * | 3/2003 | Peterson | ....................... | 709/217 |
| 2003/0126213 A1 * | 7/2003 | Betzler | .......................... | 709/206 |

OTHER PUBLICATIONS

Moran, A.L.; Favela, J.; Martinez, A.M.; Decouchant, D.; "Document presence notification services for collaborative writing", Groupware, 2001. Proceedings. Seventh International Workshop on 2001; pp. 125-133 [retrieved from IEEE database on Mar. 23, 2011].*
Saint-Andre, P.;"Streaming XML with Jabber/XMPP", Internet Computing, IEEE vol. 9, Issue: 5; 2005; pp. 82-89 [retrieved from IEEE database on Mar. 23, 2011].*
Meijerm, R., Saint-Andre, P., "Jabber, E-mail and Beyond" May 2, 2005. pp. 1-6. [retrieved from Internet "http://ralphm.net/publications/nluug_vj05-paper.pdf" on Mar. 23, 2011].*

* cited by examiner

*Primary Examiner* — Philip Chea
*Assistant Examiner* — Lashanya Nash
(74) *Attorney, Agent, or Firm* — Kilpatrick Townsend & Stockton LLP

(57) ABSTRACT

Systems and methods providing users with a rich web experience are disclosed. In one embodiment, a client and at least one server are in communication using a dual communication link. In another embodiment, a markup language based instant messaging application is disclosed. The instant messaging application may include group instant messaging. The instant messaging application may also provide group member persistence and message persistence at the server. In another embodiment, a card based web application is disclosed, where the card information and character may be shared with other users or within a group. The cards may also be configurable by users.

16 Claims, 39 Drawing Sheets

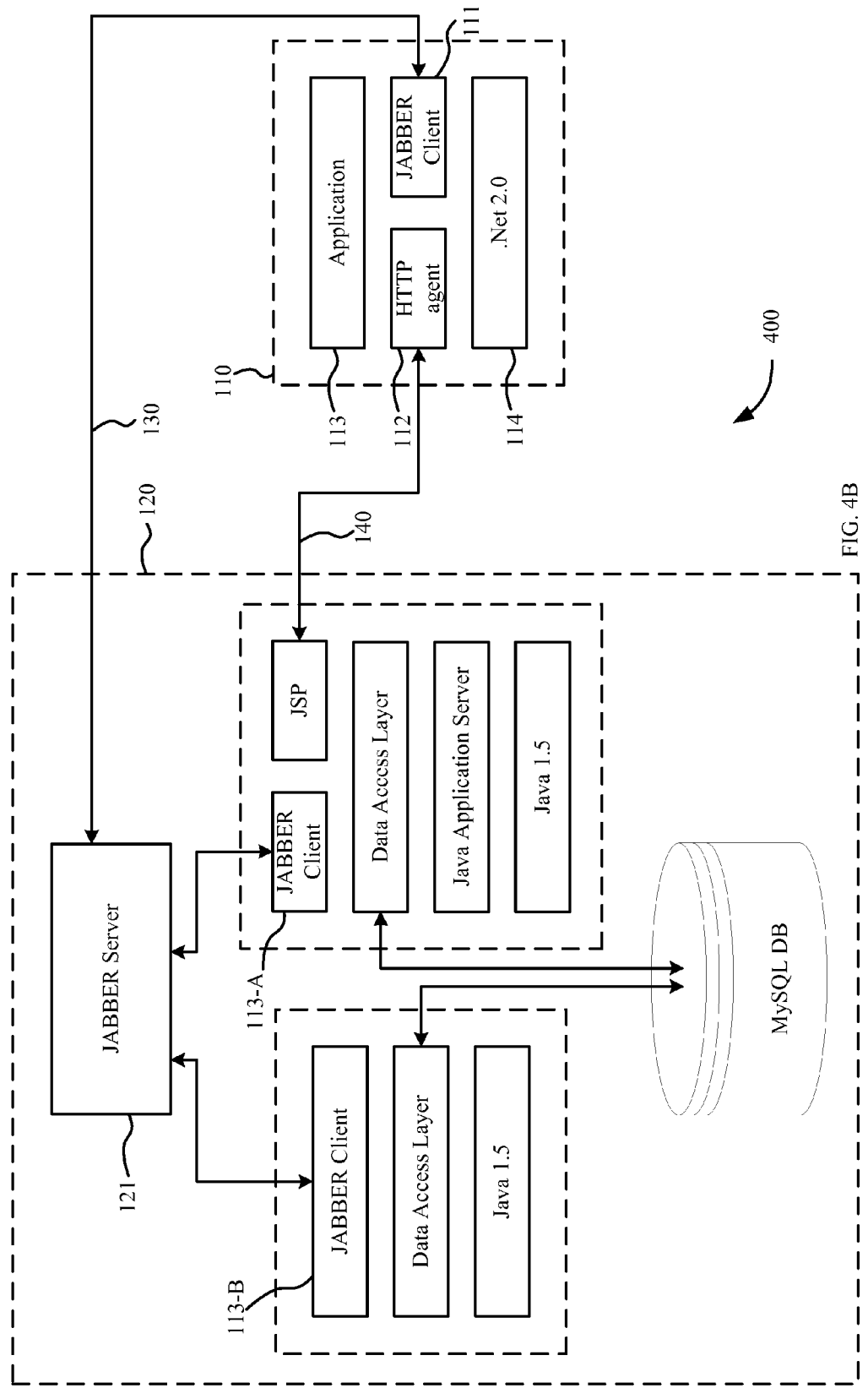

METHOD AND SYSTEM FOR MESSAGING AND COMMUNICATION BASED ON GROUPS

CROSS-REFERENCES TO RELATED APPLICATIONS

This application claims the benefit of U.S. Provisional Application No. 60/778,609, filed on Mar. 3, 2006, entitled "Method And System For Messaging And Communication Based On Groups," the entire contents of which are incorporated herein by reference.

BACKGROUND OF THE INVENTION

This disclosure relates in general to network communication applications and servers and, but not by way of limitation, to group messaging applications and servers amongst other things.

Web browsers and web-based instant messaging applications typically rely on push/pull methodologies or timers to re-download and display a web page or instant message. Web browsers, in particular, often use refresh and/or reload functions to request an already displayed web page in order to display the most up-to-date information. In particular, social networking pages often undergo regular modification and may require regular reload and/or refresh by a web browser in order to maintain the most up to date information. Moreover, web-based instant messaging (IM) applications also require a reload request prior to having data pushed to the application. Refresh/reload functions and timers require the web browser (or web application) to request a web page from the server. The systems do not permit instantaneous reload of content. Rather, timers request updated information at set intervals, and refresh/reload functions require user interaction. Some non-web-based IM applications use an open channel for rich text based messaging. Most IM applications have very little or no message persistence and/or group persistence.

Instant messaging applications typically only display instant messages in text or rich text formats. Such formats limit the interaction and richness of the instant messaging experience by not providing for customization, applications, and/or embedded media—particularly based on an open standard like HTML. Moreover, instant messaging applications are user-based. That is, messages are sent from user to user. Furthermore, instant messaging applications do not provide significant degrees of persistence for instant message conversations or for groups. Often, closing an IM application results in the loss of conversations and/or data as well as group membership.

There is a need in the art for a more interactive web browsing application as well as a more persistent, group, media & HTML-capable instant messaging application.

BRIEF SUMMARY OF THE INVENTION

In one embodiment of the invention a network communication method at a client with at least a first file is disclosed. The method includes establishing a first and second connection between the client and a server and receiving a message from the server through the first connection. The first connection may include an open connection and the first and second connections are not necessarily established at the same time. The first message may instruct the client to request first update data from the server through the second network connection.

A network communication method at a server with at least a first file is disclosed according to another embodiment of the invention. The method includes establishing a first connection between a first client and the server, receiving first update data from the first client through the first connection and updating the first file with the first update data. The method may also include establishing a second and a third connection between a second client and the server, sending a message to the second client through the second connection, receiving a message from the second client through the third connection, and sending the first update file through the third connection to the client. The second connection may be an open connection and the connections are not necessarily established at the same time. The message may tell the client that first update data is available at the server. The method may further include establishing a plurality of second and third connections between the server and each of a plurality of clients. The plurality of first connections may be open connections and the connections are not necessarily established at the same time. The method may also include sending a message to each of the plurality of clients through each of the plurality of second connections. The message may tell each of the plurality of clients that first update data is available at the server. The method may include receiving a message from at least one of the plurality of clients through at least one of the plurality of third connection and sending the first update file through the third connection to each of the plurality of clients that sent a message to the server. The message may request that the server send the first update file.

Another network communication method at a server is disclosed according to another embodiment of the invention. The method includes maintaining a first group list at the server. The first group list may comprise a list of more than one clients including at least a first client, and maintaining at least a first file at the server. The method also includes establishing a plurality of first connections between the server and a plurality of clients, sending the first file to the clients in the first group, and establishing a plurality of second connections between the server and the plurality of clients. The plurality of clients comprise at least the first client. The plurality of second connections may comprise open connections. The method may further include receiving a first message from the first client. The first message comprises an addendum to the first file, and the first message specifies that the message is intended for clients in the first group, appending the first file with the first message, determining which of the plurality of clients with a second connection are in the first group list, and forwarding the message to the plurality of clients in the first group list through the plurality of second connections.

A persistent group messaging system is disclosed according to another embodiment of the invention. The system may include a network interface, a user interface, and a processor. The network interface may be adapted to communicate with a server through one or more communication links. The user interface may be adapted to communicate with a user. The memory storage device may include instructions for the processor. The processor instructions may include instructions to retrieve at least one group message file from the server through the network interface and instructions to display more than one conversation at the user interface. The group message file may include more than one conversation.

An instant messaging application is disclosed according to one embodiment of the invention. The instant messaging application may include a network interface, a user interface, and a processor. The network interface may be adapted to communicate with a server through one or more communication links. The user interface may be adapted to communicate with a user. The memory storage device may include instructions for the processor. The instructions may include instructions to receive instant messages from the server through the network interface, instructions to display the instant messages at the user interface; and instructions to display ads at the user interface. The ads may be related to the content within the instant messages presently displayed at the user interface and as the instant message conversation progresses and the content changes the ads likewise change to adapt to the changed content.

A group instant messaging application is disclosed according to one embodiment of the invention. The group instant messaging application may include a network interface, a user interface, and a processor. The network interface may be adapted to communicate with a server through one or more communication links. The user interface may be adapted to communicate with a user. The memory storage device may include instructions for the processor. The instructions may include instructions to receive more than one instant message conversation from the server through the network interface, and instructions to concurrently display more than one instant message conversation at the user interface. The instant messages may comprise messages from more than one user and comprise more than one conversation.

A network communication apparatus is disclosed according to one embodiment of the invention. The network communication apparatus may include a web user agent in communication with a web server, and an instant messaging client in communication with an instant messaging server over an open connection. The instant messaging client may receive a message from the instant messaging server informing the network communication apparatus that an updated file is available at the web server and the web user agent requests and receives the updated file from the web server.

A network communication server is disclosed according to one embodiment of the invention. The network communication server may include an open connection server and a persistent data server. The open connection server may include an instant messaging client in communication with an instant messaging server. The persistent data server may include an instant messaging client in communication with an instant messaging server and a web server in communication with at least one web client.

An instant messaging method at a first client is disclosed according to one embodiment of the invention. The method may include receiving a widget from a user, associating the widget with a button at a client application associated with the first client, and distributing the widget to a second client through a network interface. The method may further include receiving a second widget from a third client and associating the widget with a button at a client application associated with the first client.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIGS. 4A and 4B show block diagrams of a group instant messaging server in communication with a group messaging application according to one embodiment of the invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides for a web application that instantly refreshes a web page when the web page has been updated at the server. The application is in communication with the server over two communication links: an HTTP communication link and an open communication link. The web page is transmitted over the HTTP communication link, after which the HTTP communication link may be closed. The application may be alerted that the web page has been updated through the open communication link, whereupon the application requests the updated web page from the server. In other embodiments, the open connection transmits web page updates or the updated web page. Accordingly, updates to web content occur substantially instantaneously without reload, refresh or timers. Web content may include instant messaging services, file transfer services, and/or media sharing.

In yet another embodiment, the present disclosure provides for persistent group messaging. Groups are persistent in that group membership is stored and saved on a server. Group members may have access to a group including group messages and/or content throughout the existence of the group regardless of when the group members are online and/or regardless of which computer the user uses to connect to the server. Messages are persistent in that messages are stored and saved on a server. Group members may have access to the messages and may comment and amend messages at any time. When group members are online group messages may occur substantially instantly.

Figure 1:
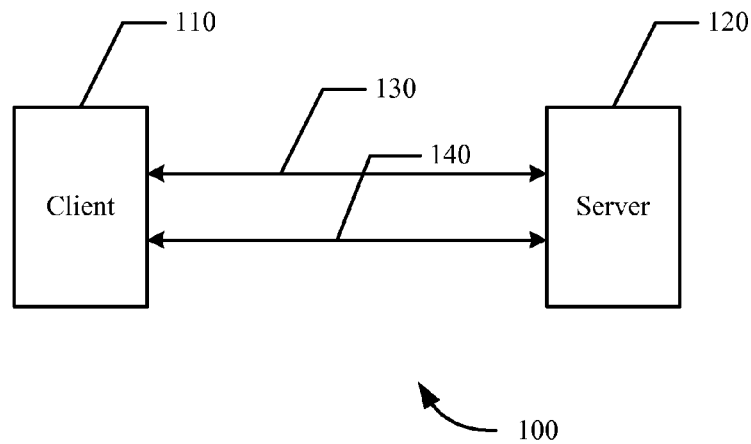
FIG. 1 shows a client in communication with a server employing two communication schemes according to one embodiment of the invention.

Referring first to FIG. 1, a dual communication system is disclosed according to one embodiment of the invention. A client 110 is in communication with a server 120 over two communication links 130, 140. The communication links 130, 140 may be different communication schemes. For example, the communications links 130, 140 may communicate using HTTP and/or JABBER protocols. Moreover, any application layer protocol may be used. The communication links may be open links. An open link is an established link permitting data to flow from source to destination without requiring either the client or the server to request data for transmission. Open connections may be maintained by sending status packets or queries between the server and the client. The connection links 130, 140 may occur over the Internet, over an intranet or over any other type of communication network.

The client may be an application running on any computing device, such as, for example, a PC, Mac, PDA, mobile phone, etc.

Figure 2:
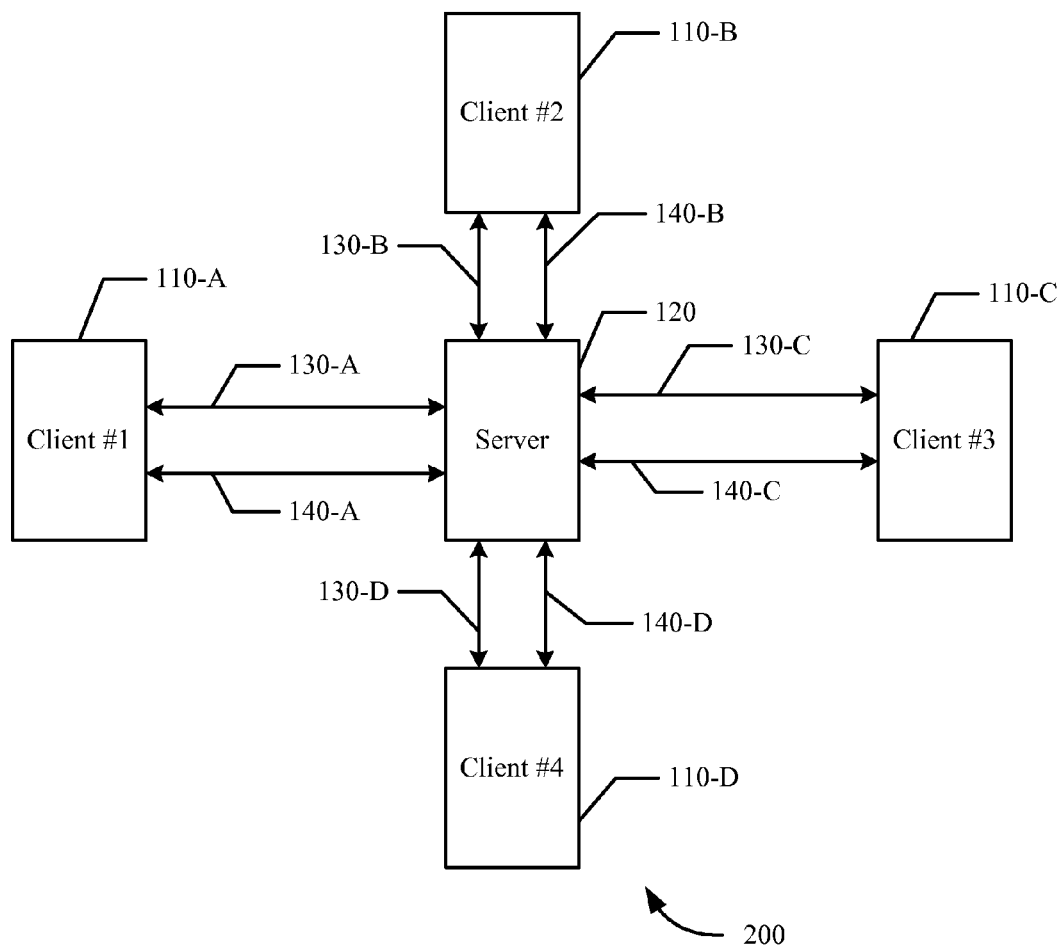
FIG. 2 shows a plurality of clients in communication with a server employing two communication schemes according to one embodiment of the invention.

FIG. 2 shows a dual communication system 200 between a server 120 and four clients 110 operating on one or more computers according to one embodiment of the invention. As shown, the four clients are in communication with the server using two communication links 130, 140. Of course, any number of clients 110 may be coupled with the server 120 using two communication links. The clients 110 may be coupled with the server 120 over the Internet, over an intranet or any other type of communication network. One or more clients may be running as an application on the same computer. Users may run more than one instance of a client application and/or be logged in as more than one user.

Figure 3:
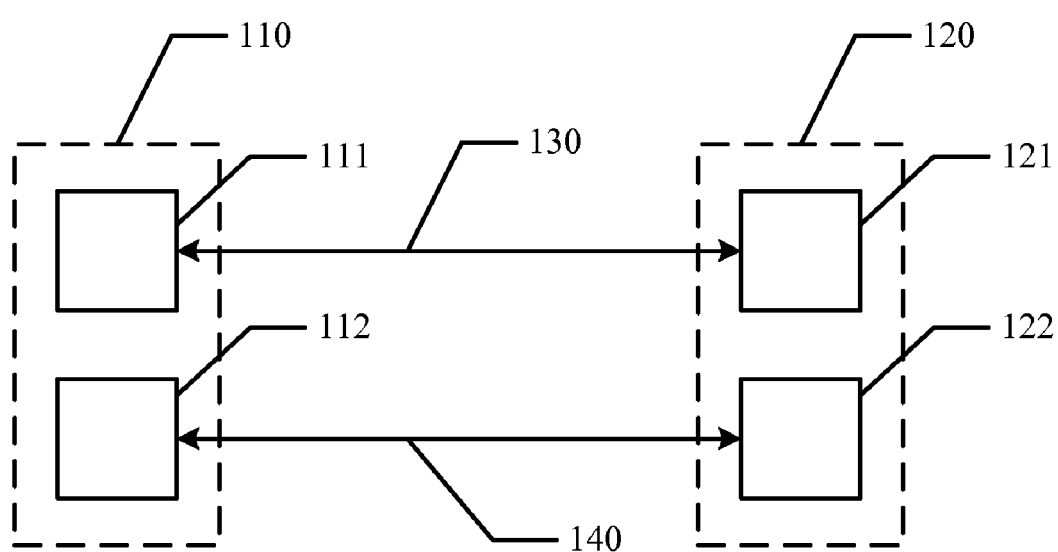
FIG. 3 shows JABBER and HTTP connections, interfaces and servers in a communication system according to one embodiment of the invention.

FIG. 3 shows a client 110 and a server 120 with client and server components according to one embodiment of the invention. In this embodiment, the client 110 includes a JABBER client 111 and a web client 112. The JABBER client 111 is in communication with a JABBER server 121 over the open connection 130. The web client 112 is in communication with a web server 122 over an HTTP connection 140.

Figure 4A:
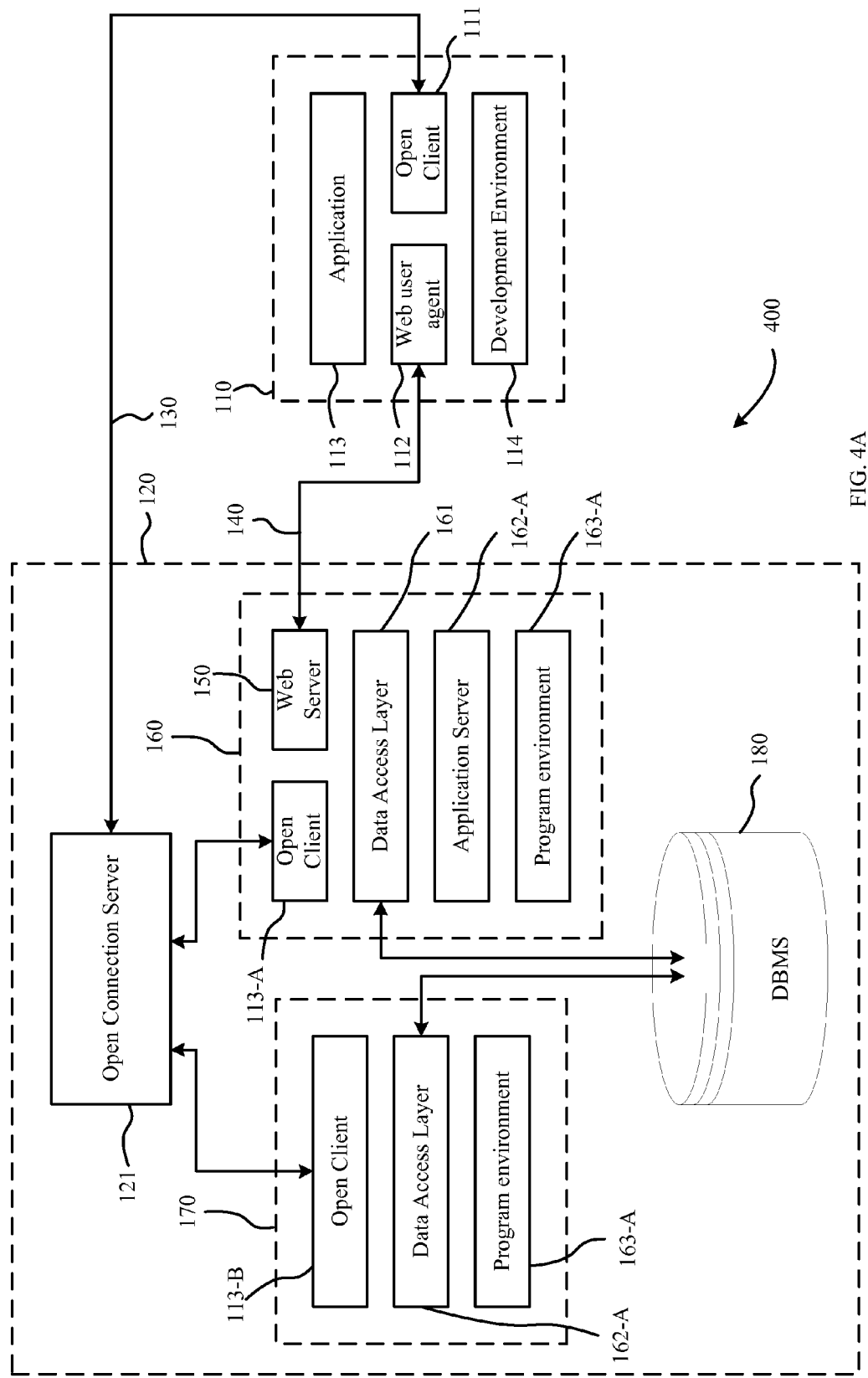

FIG. 4A shows more detail of components 400 within a client 110 and server 120 according to one embodiment of the invention. The client 110 includes an application 113, an open client 111, a web user agent 112, and a development environment 114. The application 113 coordinates input from a user through a user interface and information from the server through the communication links 130, 140. The application may be stand-alone software embedded in a storage medium on a computer and operable through a computer processor. The application may run as multiple instances on the same computer.

The web user agent 112 communicates with the web server 150 through communication link 140. The web user agent 112 may fetch data from or submit data to the web server using, for example, HTTP. Various other transfer protocols are known in the art and may be used by a web user agent to send and receive files from the web server 150.

The open client 111 communicates with the open connection server 121 through communication link 130. The open client may be an instant messaging client. The communication link 130 may be an open communication link. The open client 111 may receive an instant message from the open connection server 121. The open connection server 121 and the open client 111 may utilize any instant message protocol. For example, the open connection server 121 and open client 111 may communicate using Gadu-Gadu, Cspace, IRC, Meca Network, MCNP, OSCAR, PSYC, TOC, TOC2, XMPP, SIP/SIMPLE, YMSG, DirectNet, Zephyr, Gale and/or Skype. Other protocols may also be used.

The development environment 114 is the environment used to develop the client 110. Various development environments are known in the art and may be used to program and code the client 110.

The server 120 includes an open connection server with an open connection server 170 and a persistent data server 160. Other servers may be implemented with the server 120. Within these two servers 160, 170 are various other components. The persistent data server 160 includes an open client 113-A and a web server 150. The open client 113-A is in communication with the open connection server 121. The persistent data server 160 also includes a data access layer 161 in communication with a database 180. The data access layer 161 pulls files, updates files and creates files in the database 180. An application server 162 may also be included. The persistent data server 160 is developed within a program environment 163 open connection server 170 also includes an open client 113-B in communication with the open connection server 121 as well as a data access layer 162-B and a program environment 163-B.

FIG. 4B shows specific exemplary components 400 within a client 110 and server 120 according to one embodiment of the invention. In this embodiment, the open connection server 121 is a JABBER server 121 and the open clients are JABBER clients 111, 113. The Web client is an HTTP client 112. The database is a MySQL database 180. The application servers 162 are Java application servers and the program environment is a Java 1.5 environment 163. The development environment is the .Net 2.0 environment. The web server is Java server pages (JSP) 150. Furthermore, the connection between the HTTP client 112 and the JSP 150 is an HTTP connection and the connection between the JABBER server 121 and the JABBER client 111 is an open connection. In one embodiment, this open connection streams XML.

Figure 5:
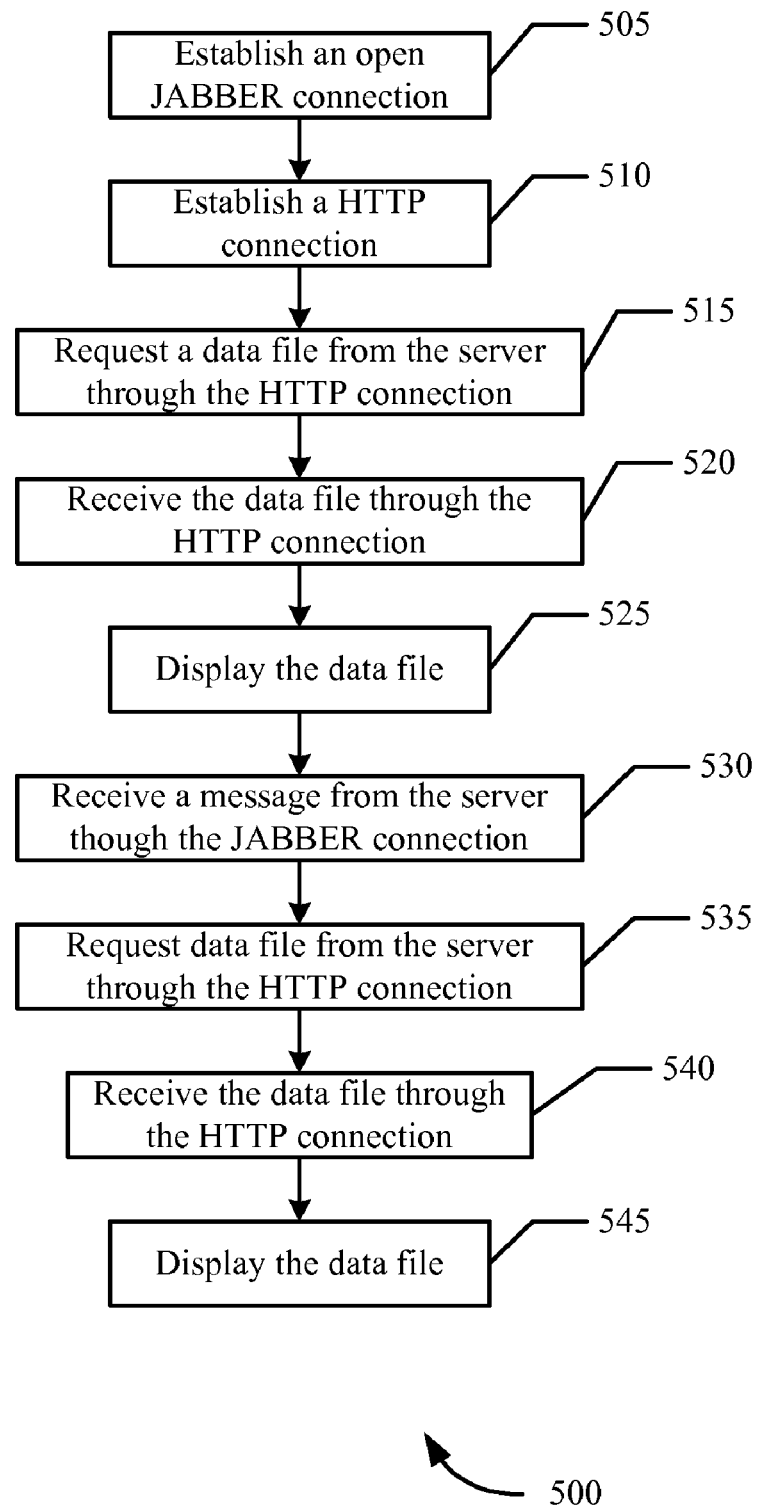
FIG. 5 shows a flowchart describing a method of instantly displaying updated data at a client system in a network configuration according to one embodiment of the invention.

FIG. 5 shows a flowchart 500 describing a method of instantly displaying updated data at a client system in a network configuration according to one embodiment of the invention. The client establishes an open JABBER connection with a server 505 and an HTTP connection with a server 510. A data file is requested from the server through the HTTP connection 515. The data file is then sent to the client through the HTTP connection 520. The data file may include HTML and may be displayed to a user at the client through a user interface 525. For example, a user may request a web page from a server. The web page is retrieved from the server and then displayed on the screen of the computer used by the user.

A message from the JABBER server is then received by the client through the JABBER connection 530. The message may instruct the client to refresh the data file because the data file has been updated. The data file is requested through the HTTP connection 535 whereupon the updated data file is transmitted from the server and received at the client 540. The data file is then displayed again to the user through the user interface 545.

Figure 6:
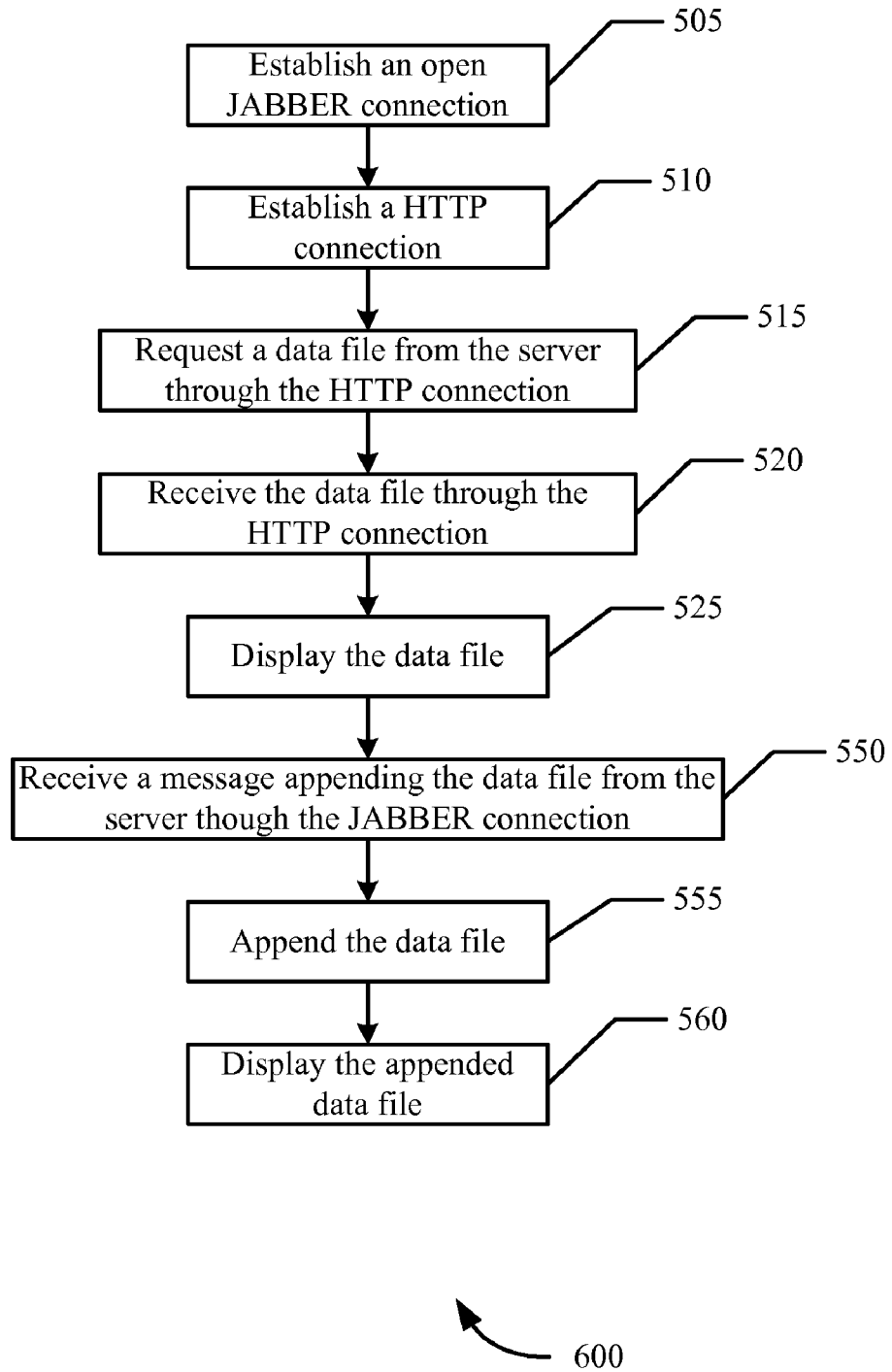
FIG. 6 shows a flowchart describing a method of instantly displaying updated data at a client system in a network configuration according to one embodiment of the invention.

FIG. 6 shows another flowchart 600 describing a method of instantly displaying updated data at a client system in a network configuration according to one embodiment of the invention. This embodiment is similar to the embodiment discussed above in regard to FIG. 5. The embodiment follows the embodiment discussed in regard to FIG. 5 until the data file is displayed at block 525. A message may then be received from the server through the JABBER connection 550. In this example, the message is an addendum to the data file. The data file is updated using the message 555. The appended data file is then displayed 560.

Figure 7:
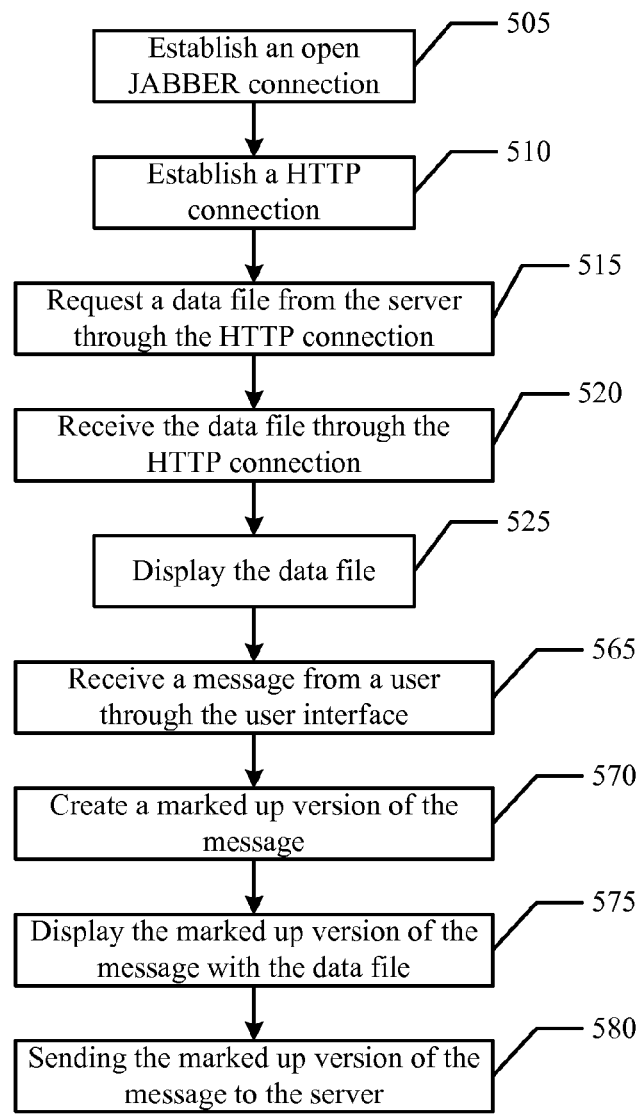
FIG. 7 shows a flowchart describing a method of instantly displaying updated data at a client system in a network configuration according to one embodiment of the invention.

FIG. 7 shows a flowchart 700 describing a method of instantly displaying updated data at a client system in a network configuration according to one embodiment of the invention. In this embodiment, a JABBER and an HTTP connection are established 505, 510 between a client and a server. A data file is requested from the server by the client through the HTTP connection 515. The data file is sent by the server and received at the client through the HTTP connection 520. The data file is then displayed through a user interface at the client 525. The data file may include a markup language such as HTML, XHTML, XML or any other mark up language. The data file may be displayed in a file specific application, a specialized web browser and/or a standard web browser. The data file may include an instant message conversation. The data file may also include color schemes and/or preferences.

A message is received at the client from the user through the user interface 565. The message may include text, data, media, pictures, images, widgets, movies, music, changes to the data file, a markup language, such as HTML, etc. A markup language version of the message is created 570 and the markup language version of the message is displayed with the data file through the user interface 575. The markup version of the message is also sent to the server 580. The server may forward the markup version of the message to other clients and/or save the markup version of the message within the data file.

Figure 8:
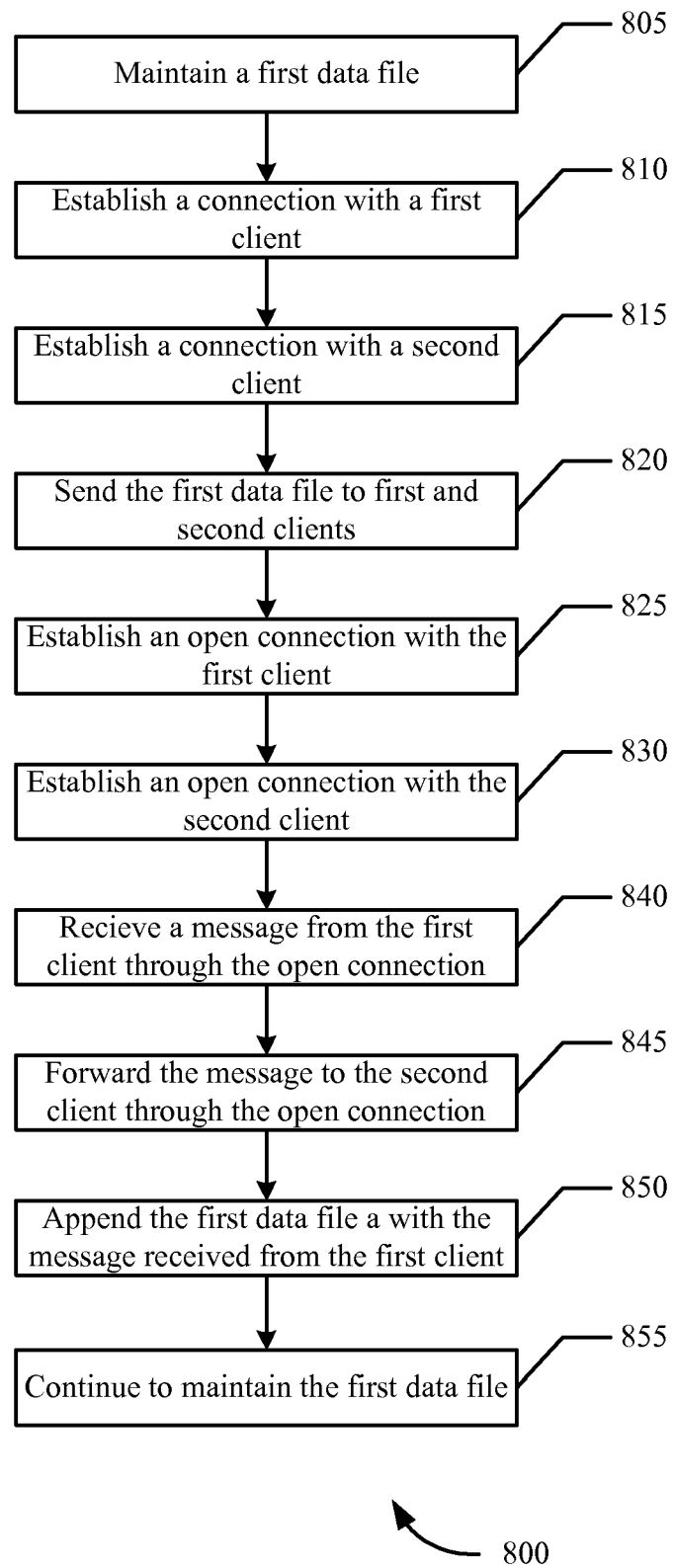
FIG. 8 shows a flowchart describing a method of managing an instant messaging server according to one embodiment of the invention.

FIG. 8 shows a flowchart 800 describing a method of managing an instant messaging server according to one embodiment of the invention. A first data file is maintained on the server 805 and may be accessible by members of a group. A connection is made from the server to a first client and to a second client 810, 815. The first data file is sent to the first and second clients 820. After the first data file is sent to the first and second clients, the connections may be closed. An open connection between the first client and the server and the second client and the server is made 825, 830. The first client sends a message to the server through the first open connection 840. The message is then forwarded to the second server 845. The first data file is appended with the message received from the first client 850 and the first data file as appended by the message from the first client is maintained 855 at the server.

The open connections between the first client and the server and the second client and the server may be established before or after the first data file is sent to the server. Other clients may request the first data file. The data file may be sent to other clients with the appended data from the message received from the first client. Other clients may also send messages to the server, have those messages forwarded to the other clients and have the first data file appended accordingly. Furthermore, multiple data files may be maintained at a server.

Figure 9:
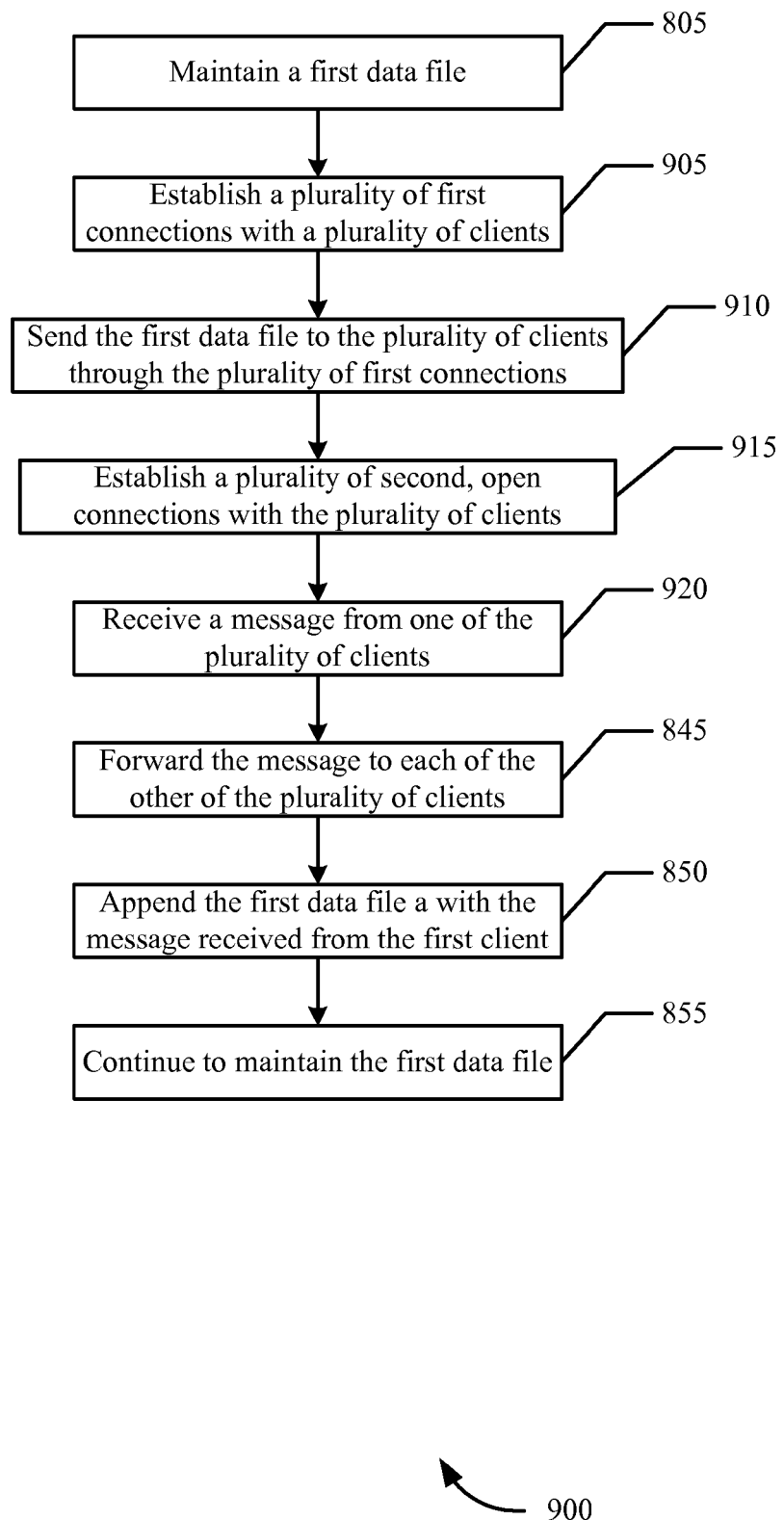
FIG. 9 shows a flowchart describing a method of managing an instant messaging server according to one embodiment of the invention.

FIG. 9 shows another flowchart 900 describing a method of managing an instant messaging server according to one embodiment of the invention. In this embodiment, a first data file is maintained at the server 805. Connections are made with more than one client 905. The first data file is sent to the more than one client through the connections 910. A second connection is established between the more than one client and the server 915. The second connection may be an open connection. A message is received at the server from one of the more than one client 920 and is forwarded to the other clients connected to the server 845. The first data file is also appended 850 and saved at the server 855.

Figure 10:
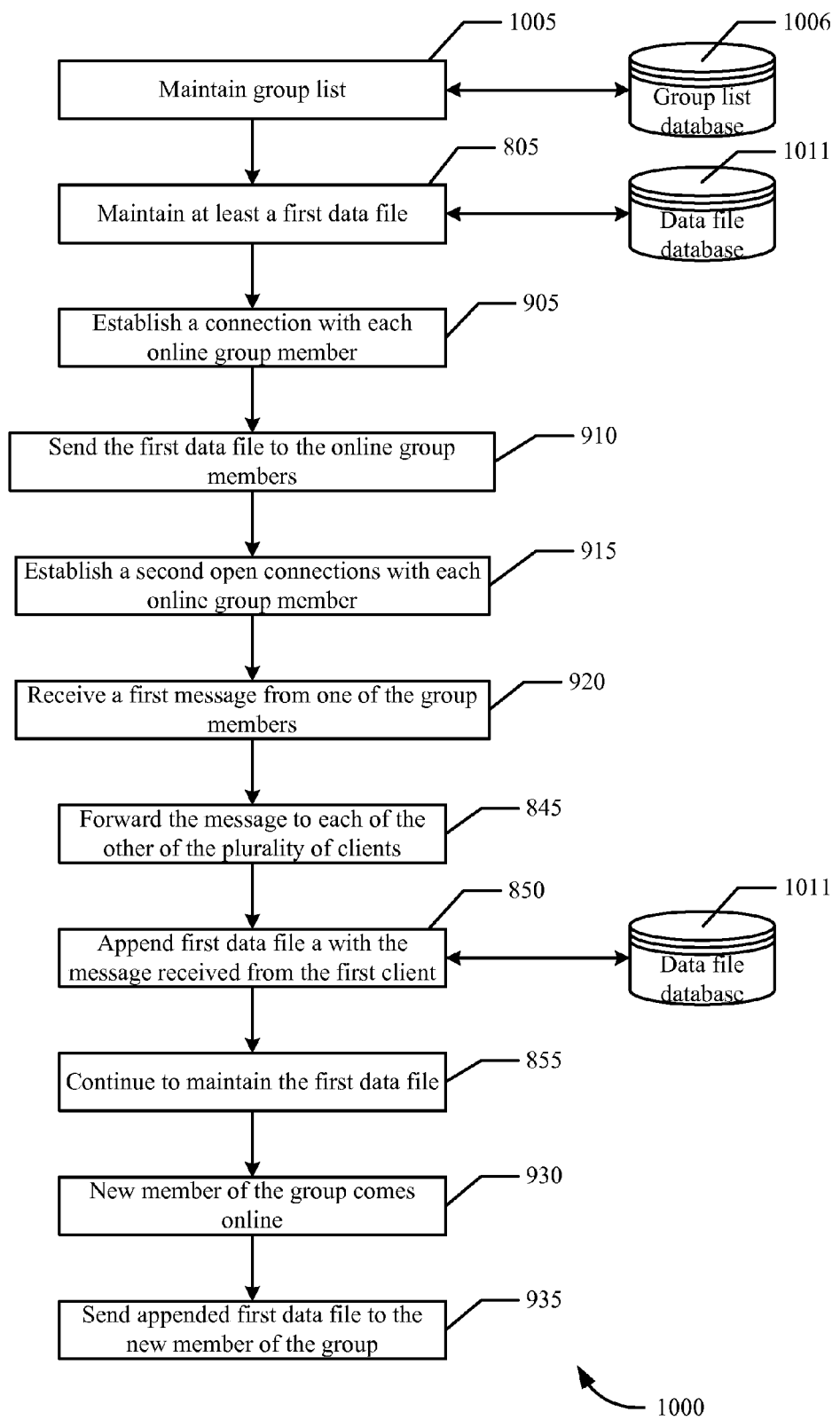
FIG. 10 shows a flowchart describing a method of managing a group instant messaging server according to one embodiment of the invention.

FIG. 10 shows a flowchart 1000 describing a method of managing a group instant messaging server according to one embodiment of the invention. A group list is maintained 1005. The group list may include information related to the group and/or the individual group members. The group list may include personal information, settings, preferences, IP addresses, aliases, passwords, encryption keys, etc. The group list may be saved in a group list database 1006.

At least one data file, a first data file, is maintained 805 in a data file database 1011. A connection is established 905 with each online group member, and the first data file is sent to each online group member 910. These connections may occur at different times and the first data file may be sent to each online group member at different times. Once the first data file has been sent and received, each connection between the server and the online group members may be closed. An open connection may be established with each group member 915. A message is received from one group member through the open connection 920. The message is then forwarded to each member in the group 845. The first data file is appended with the data in the message 850 and stored in the data file database 1011. The first data file is maintained 855 in the data file database 1011. At some point a new member of the group comes online and/or signs in 930, whereupon the appended first data file is sent to the new member in the group 935.

Figure 11A:
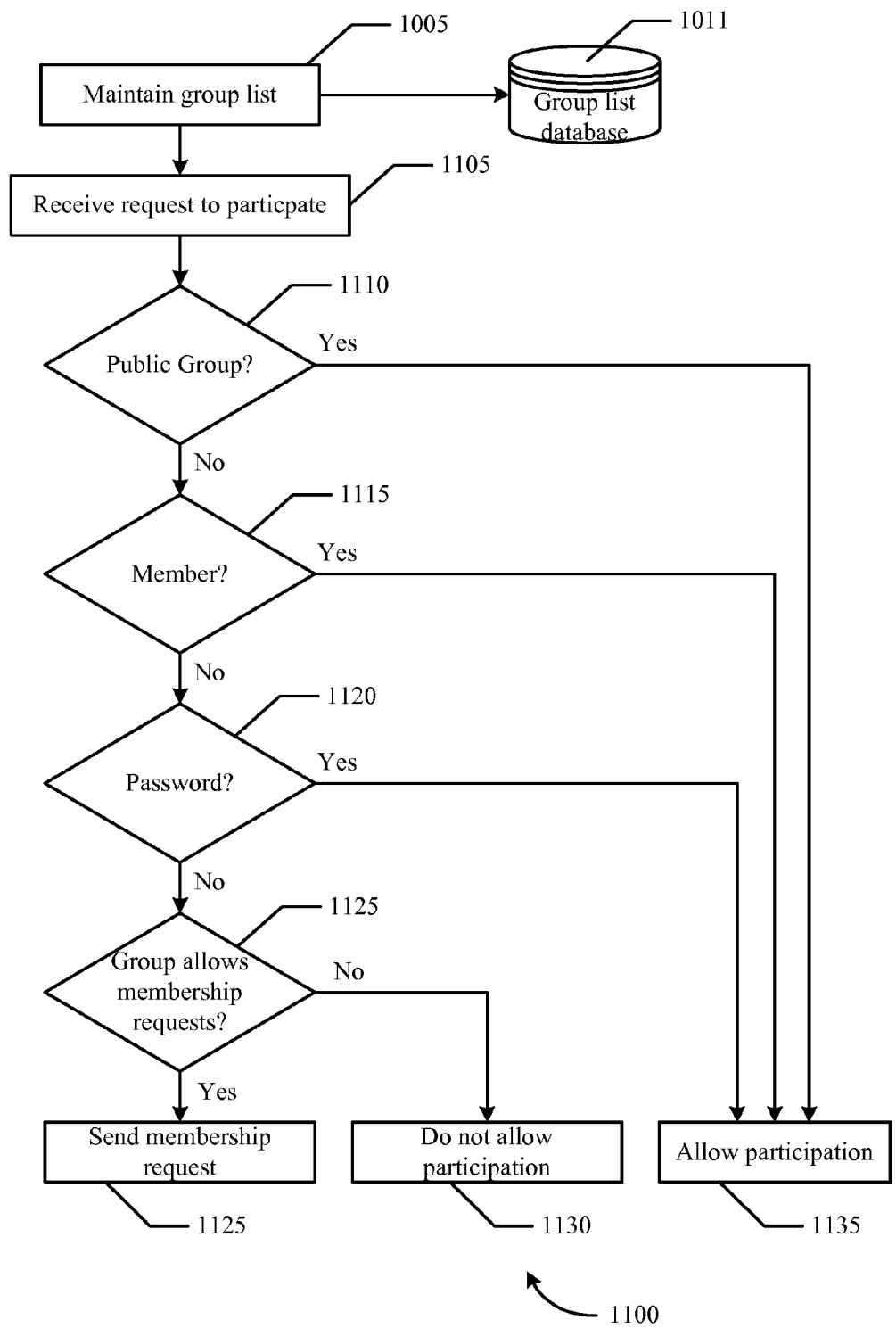
FIGS. 11A-C show a method of determining whether a new user may participate in a group according to one embodiment of the invention.

FIG. 11A shows a method 1100 of determining whether a new user may participate in a group according to one embodiment of the invention. Users may gain access to groups in a variety of ways. One embodiment of the invention determines whether a user has the appropriate privileges to access group information. A group list is maintained 1005 in a group list database 1001. The group list includes whether the group is password protected, whether the group is public or private and/or whether group entry requires an invitation or not. A user first requests to participate in the group 1005. The system then determines whether the group is public 1110. If the group is public, then participation is allowed. Otherwise, the group is private and the system may determine whether the user is a member of the group 1115. Membership information may be included in the group list. If the user is a member, participation is allowed 1135. Members may be asked to provide a password or other authentication scheme. If the user is not a member of the private group, the user may be able to participate in the group by providing a password 1120. If the password is correct, access to the group is allowed. The password may or may not provide membership to the group. In some embodiments, the password may be a one time use password or may limit participation. If a password is not provided, a user may gain access to the group by requesting group membership to the group owner 1125. Some groups may not allow group membership requests and participation would then be denied 1130. Otherwise, a participation request is sent to the group owner or group members that approve group membership requests 1125.

Figure 11B:
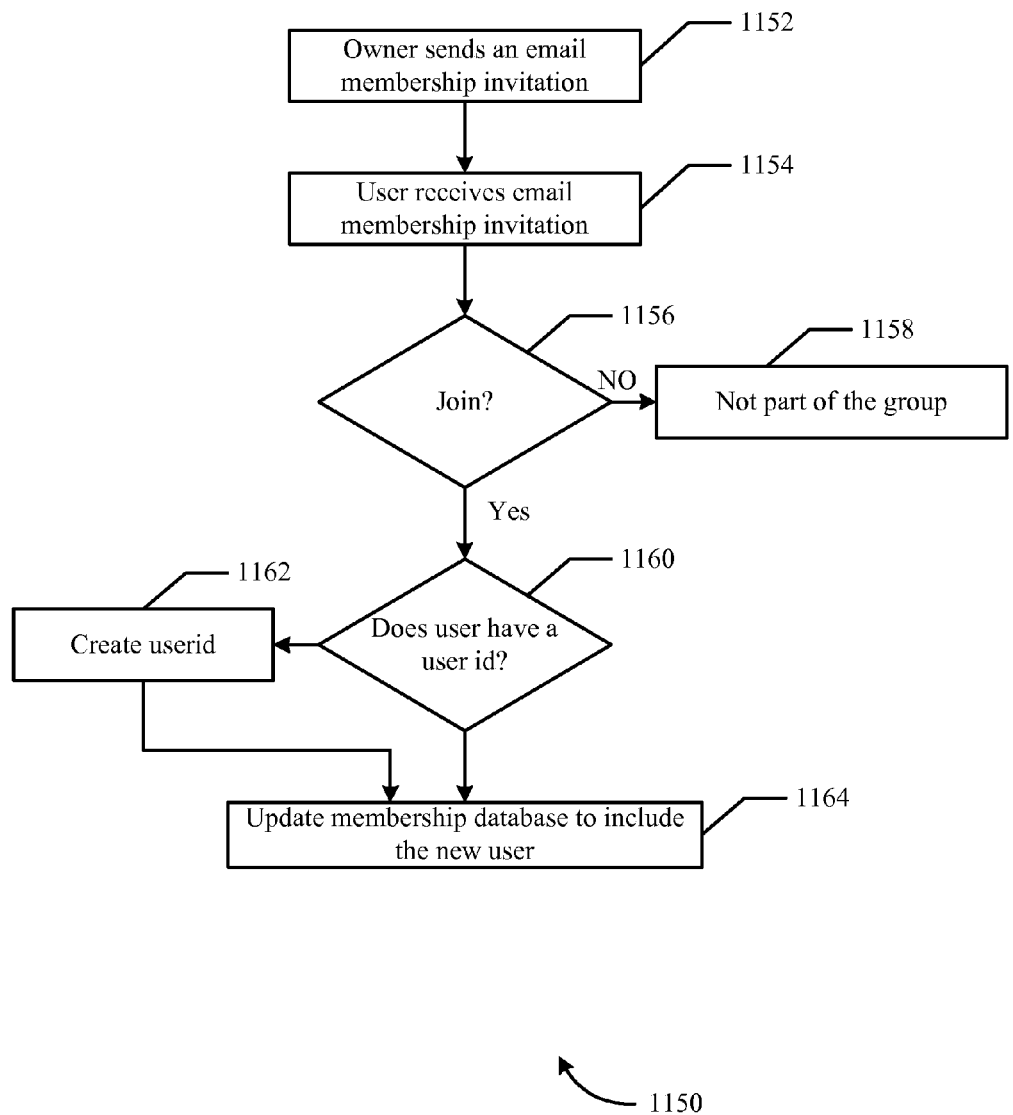

FIG. 11B shows a method 1150 of inviting a user to join a group according to one embodiment of the invention. The owner of the group or any authorized member may send an email message with a membership invitation 1152. The user receives the invitation in email 1154 or in a group messaging application. The user may then decide whether to join the group or not 1156. If the user does not want to join the group he may simply ignore the email from the owner of the group and he is not entered into the group 1158. If the user received the invitation message in a group messaging application, he may be presented with options to join or not join. The user may then simply select his preference, for example, on a button. If the user chooses to join the group he may be directed to a web page or a card within the application may open where he can enter personal details or confirm his identity. If the user already has a user ID 1160 then the group membership database is updated 1164 and he is entered into the group. If the user does not have a user ID he may be directed to create one 1162, prior to having the group membership database updated 1164.

Figure 11C:
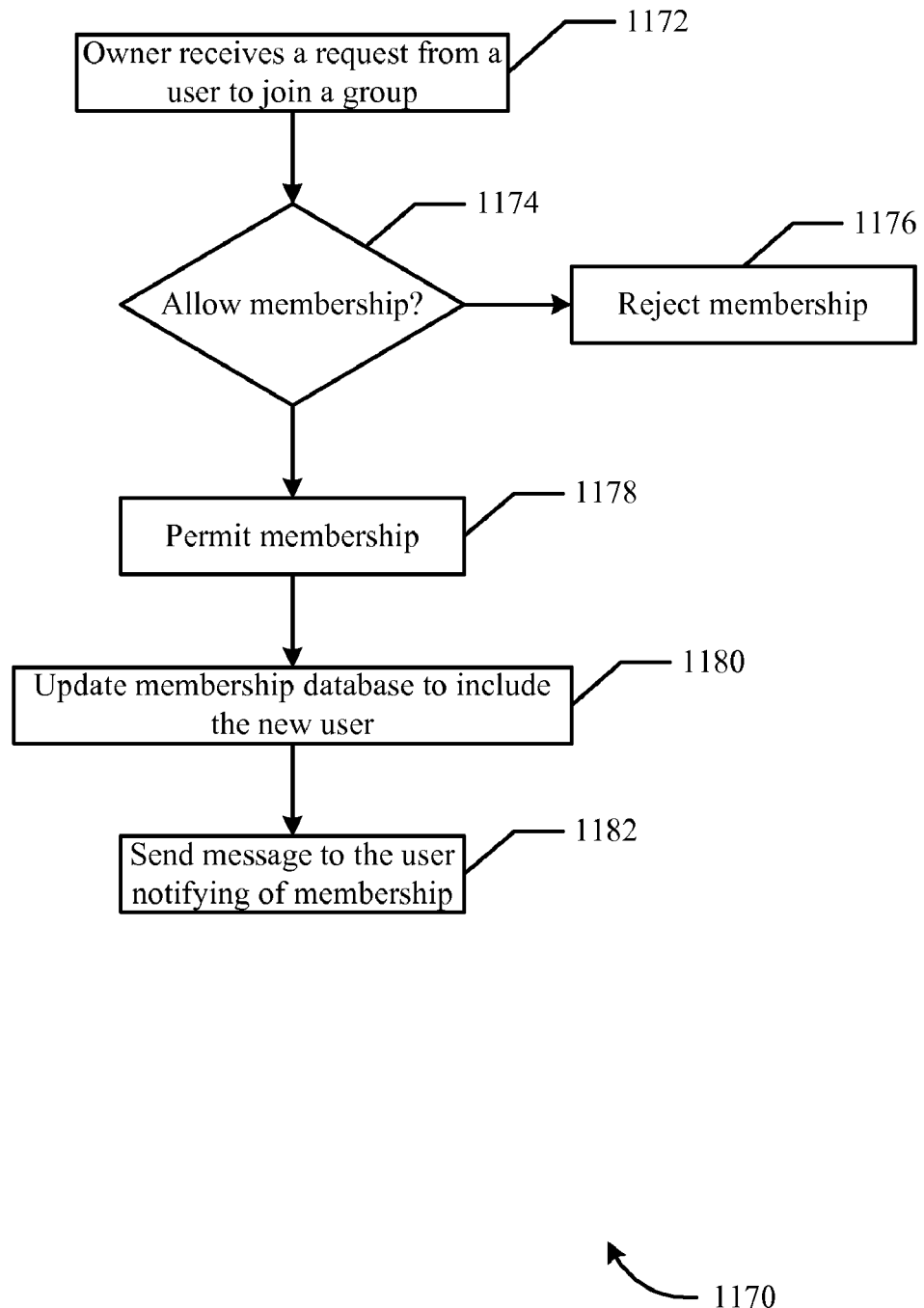

FIG. 11C shoes a method 1170 for dealing with requests to join a group according to one embodiment of the invention. The request may come from block 1125 in FIG. 11A. The owner receives a request from a user to join a group at 1172. The request may be received within a group application or may be received via email. The owner then decides whether or not to allow the user to join the group at 1174. If the owner so desires, membership may be rejected at 1176 or permitted at 1178. If membership is permitted 1178, then the membership database is updated to include the new user 1180 and a message is sent to the user letting him know he are in the group at 1182. The user may also be required to create a user ID if he doesn't presently have one.

Figure 12A:
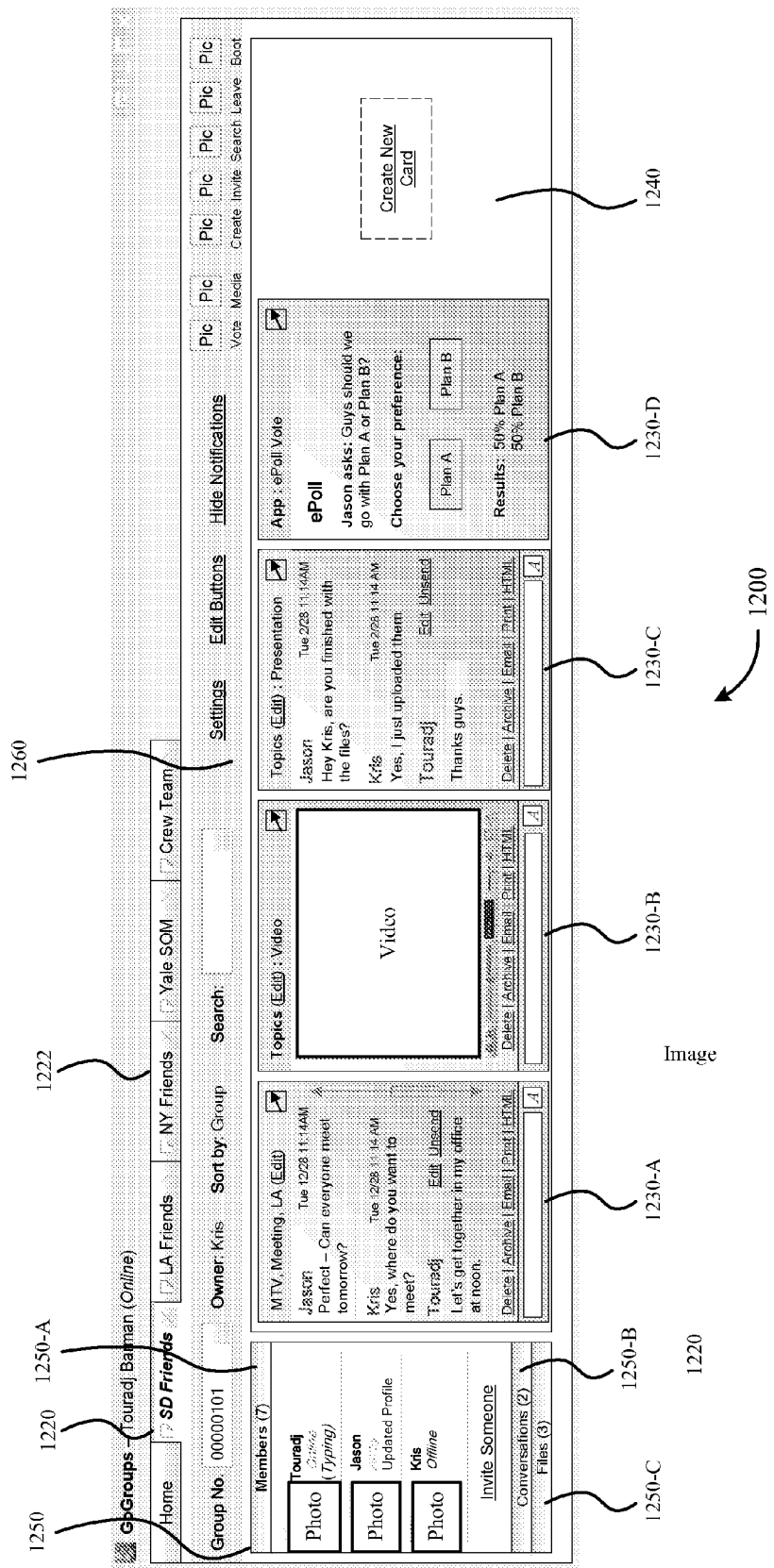
FIGS. 12A-C show screenshots of various features of a group messaging application according to one embodiment of the invention.

FIG. 12A shows a screenshot 1200 of various features of a group messaging application according to one embodiment of the invention. A graphical user interface is shown including a toolbar 1220, four active cards 1230, an inactive card 1240, a menu bar 1260, and a minitab listing bar 1250. A group may include any number of cards. Each card can be considered part of the group conversation. In general, users may create cards and add to content on existing cards. Specifically, a card may include IM functionality where users in a group may carry on a conversation. The messages may be displayed using a markup language such as HTML or XML.

The toolbar 1220 presents a variety of different views for the user to select from. FIG. 12A shows the "SD Friends" window as the active viewable window. Other windows may be activated and viewed by simply selecting the tab representing the window. For example, the "Yale SOM" window may be activated by selecting the "Yale SOM" tab 1222. Various management tabs may also be present. As shown a "Welcome" tab is shown. Other tabs representing other windows such as settings, profiles, search, adding groups, deleting groups, etc may also be included in the toolbar 1220.

Four active cards 1230 are shown. Each card 1230 is part of the overall group conversation and may be started by any member in the group. Each card may include any format and present a variety of information. For example, a card may include group messages 1230A, 1220-C, embedded media 1230-B, and/or a group poll 1230-D.

Cards can be customized according to one embodiment of the invention. A user or group of users can create a card that has a unique or personalized look. This unique or personalized look can be specific to one or more groups, or can be specific to all of the groups to which a user belongs as a whole. For example, each user within a group may be assigned a card color; every time the user sends a message to a group, the card that contains his message may be that unique color. This way one can identify, which user sends which messages, among other things and other methods.

A user can customize a card through settings. Customizations can include but are not limited to: selecting the card's color, background images, selecting the background color, size and font of the text on the card, selecting an image to appear on the card, adding animation, selecting media to appear on the card; applying widgets to the card; etc. A default customization may also be selected whereby new cards are opened with the default customization. Customizations may also be saved in a cascading style sheet (CSS) file. The CSS file may provide customization to a single card and may be used to apply the customization by default to all other cards. Also, the CSS file provides for a simpler HTML or XML code within each card by saving the card presentation characteristics in the CSS file while the content is maintained within a markup language file. The CSS file may be saved locally on the computer running the application and/or the CSS file may be maintained on a server.

Also, a group of users may have their cards customized automatically according to one embodiment of the invention. For example, a company or organization can decide that it would like everyone in its company or organization to have its company or organization's logo on every card someone in its company or organization sends. The application can set a certain group of people to have card customizations like this or others as a group. Its cards may all look alike, or the cards can be similar in only one or more respects, such as all having the company logo on its cards, but having all other card customizations selectable by the user. In some cases the user can override the card customizations that have been set for them as a group; in some cases, the user cannot do so.

Groups that are to share certain card customizations can be established based on any number of methods. These methods include but are not limited to: everyone with an email address from a certain domain can be set to share the same customizations. For example, everyone with an email address from a certain company can have that company's logo automatically display on their cards. Also, a pool of email addresses or usernames can be set up to share certain card customizations. Other ways of grouping users who are to share the same card customizations are also possible.

According to one embodiment of the invention, cards can also be set to appear not as cards at all, but as messages contained within groups in purely a text (or any other) format, not entirely unlike the way that messages are exchanged within standard instant messengers. The messages would still be grouped within the groups to which they belong. Cards can also be dragged directly onto the desktop. When a card has been dragged onto the desktop, the card can be set to dynamically display the most current message in a group. The card can also be set to dynamically display the most recent message sent by a particular user. The card can also remain as a static message. The card can also be a blank card that can be ready to accept a new message to be sent to a group. The card can also be configured to display a certain message according to any other algorithm or set of preferences. Group tabs can also be customized by the group owner (or another entity) in any number of methods.

In another embodiment, the menu bar 1260 may also have a button that opens a new card in the application. The new card may, by default, be an instant messaging card. The card may also be styled according to user and/or group preferences.

Cards may contain messages. In some embodiments, there is one message per card. Each card may contain certain details that are relevant to the message and/or sender-specific to that card. Each card may contain details such as, but is not limited to, the sender's user name, the date and time the message was sent or received, the message (which can contain text, audio, video, files, links, or any other data), etc. Within the card links may be included that include, but are not limited to: Profile (allows the sender's profile to be viewed), Email (allows the sender to be directly emailed), IM (allows a traditional IM conversation with the sender to be initiated), Web Page (allows the sender's web page to be accessed), etc. The card may also indicate the online status of the sender. The status may vary depending on what the user is doing. In other embodiments, the status may include an editable message by the user. For example, when the user is online and able to participate, the status may indicate "online". When the sender is online but has experienced a period of inactivity the status may be indicated as "away". When the user is not logged into the system the status may be "offline". Various other status indicators may be used.

An inactive card 1240 is also shown. The inactive card 1240 allows a group member to create a new card. A card creation and/or customization window may open when the user selects the "create a new card" link with in the inactive card 1240. The new card is placed within the user interface. Once a new card is created, a new inactive card may be presented. In another embodiment of the invention, the new card is an IM card by default. Changes may be made to a default card, for example, by editing the mark up language.

Cards can be customized. A user or group of users can create a card that has a unique or personalized look. This unique or personalized look can be specific to one or more groups, or can be specific to all of the groups to which a user belongs as a whole. By default, each user within a group is assigned a card color. This means that every time that user sends a message to a group, the card that contains his message may be that unique color. This way one can identify which user send which messages, among other things and other methods. The status may also be edited and/or customized by the user.

A user can customize his card through settings. Customizations can include but are not limited to: selecting the card's color, selecting the color, size and font of the text on the card, selecting an image to appear on the card, etc. Also, a group of users can have his cards customized automatically. For example a company or organization can decide that he would like everyone in his company or organization to have his company or organization's logo on every card someone in its company or organization sends. The system can set a certain group of people to have card customizations like this or others as a group. Is cards can all look alike, or the card can be similar in only one or more respects, such as all having the company logo on his cards, but having all other card customizations selectable by the user. In some cases the user can override the card customizations that have been set for them as a group; in some cases, the user cannot do so.

These groups that are to share certain card customizations can be established based on any number of methods. These methods include but are not limited to: Everyone with an email address from a certain domain can be set to share the same customizations. For example, everyone with an email address from a certain company can have that company's logo automatically displayed on his cards. Also a pool of email addresses or usernames can be set up to share certain card customizations. Other ways of grouping users who are to share the same card customizations are also possible.

Cards may also include instant messaging 1230-A, 1230-C. Messages may be added to the list of messages by entering text into the text field. When a message has been added, each member of the group that is online displays an update to the card that includes the new message. Users may edit posted messages after the message has been posted in the card. Users may also include markup language in their messages. A URL may be entered into the text field and the Web page or files associated with the URL may be rendered and displayed within the card rather than displaying the URL link to the web page or files.

Users may also edit and delete past messages within a card. The information presented in a IM card is dynamic and may be edited or deleted by the user. Those edits may be sent to the rest of the group. For example, a user may be writing an instant message and he sends the message. The user may have a typo in the message or regret that he sent the message. The user may then simply edit the message within the card and those edits may be sent to the group as well as to the data file on the server where the group data persists. The system may limit edits and deletes only to the last version or for a certain time period.

The menu bar 1260 may contain information with details about the group and buttons that enable key actions related to that group or other groups. Details include but are not limed to details such as the group's age, owner, the number of messages that have been sent to that group, the security level of that group, etc. Buttons enable users to create a group, leave or delete a group, invite a user to a group, remove a user from a group, search for groups, search for users, and do other things.

The Menu bar may also contain buttons. Many of these buttons may be specifically related to the visible group, while some of them may not. These buttons include but are not limited to: Edit Profile (users can create a profile of themselves that others can view), Settings (users can choose to personalize many settings and customizations), Create Group (users can create groups), Delete or Leave Group (users can delete and/or leave groups), Find Group (users can search for groups and request to be invited to groups), Add User (users can add or invite users to their groups), Remove User (users can remove users from their groups), Find Users (users can search for other users and then invite them to their groups if desired), etc. Another button may be included to open up card widgets that have been created by others in the group or by the user of the group.

The menu bar 1260 may also include the group name rather than the group number. When a user enters a group name in a search box within the application, the group name may be translated into a group number and the user may be directed to that group's profile. If the user is a member, he may be transferred automatically to the group and begin participation. A user may also search for members within the search bar.

The minitab listing bar 1250 may include a number of minitabs. In this embodiment of the invention, three minitabs are shown: Members 1250-A, Conversations 1250-B, Files 1250-C. The members' minitab is open and shows the members in the current group. The members may be listed in any manner and may include a variety of member information. In this embodiment, the user name, a user image, the user status (typing, away, offline) and whether the user profile have been updated. The members' individual profiles may be viewed by selecting the user's name and/or image.

Figure 12B:
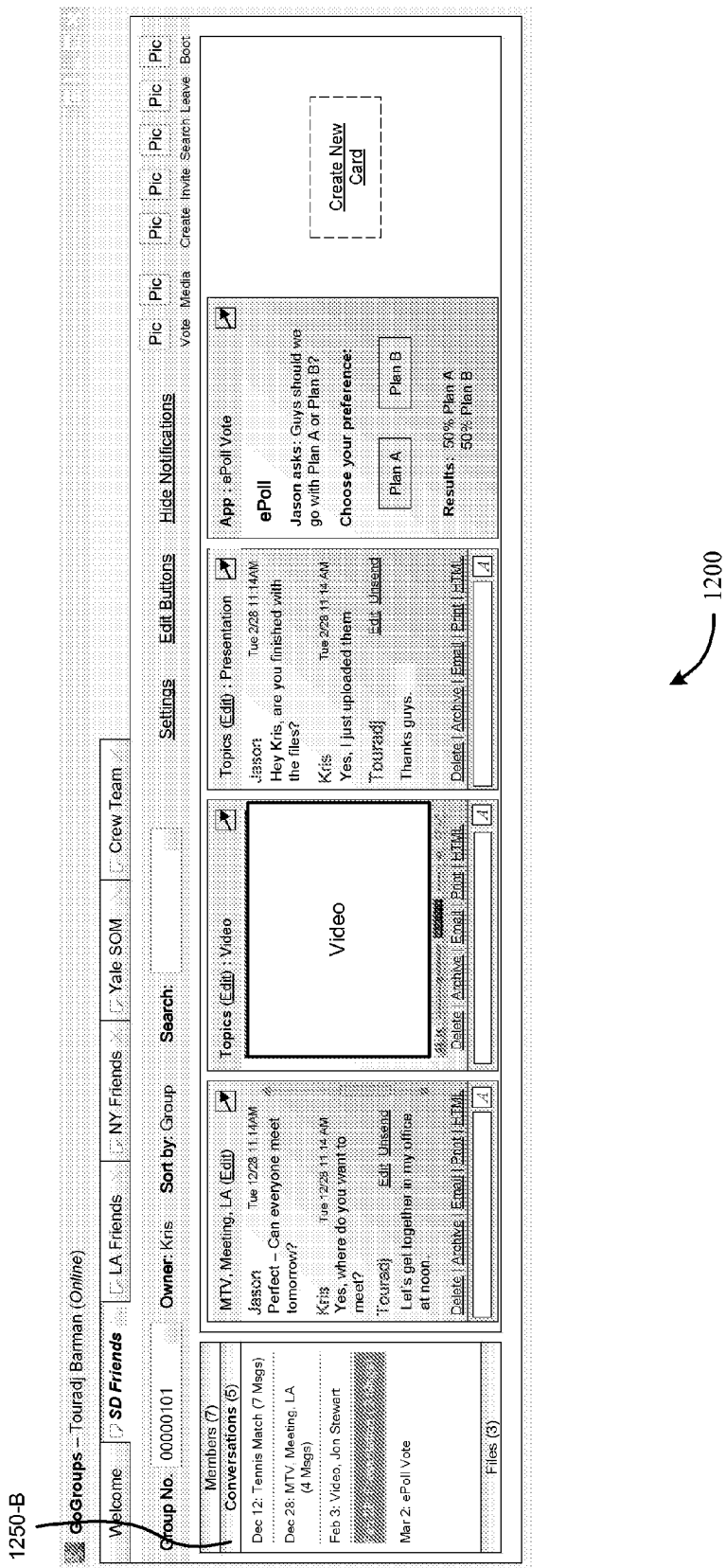

FIG. 12B show the "Conversations" minitab 1250-B. In this minitab, the users' conversations are listed in reverse chronological order. The number of messages within each conversation is also shown. The conversations listed in the conversations minitab 1250-B relate to cards within a group window.

Figure 12C:
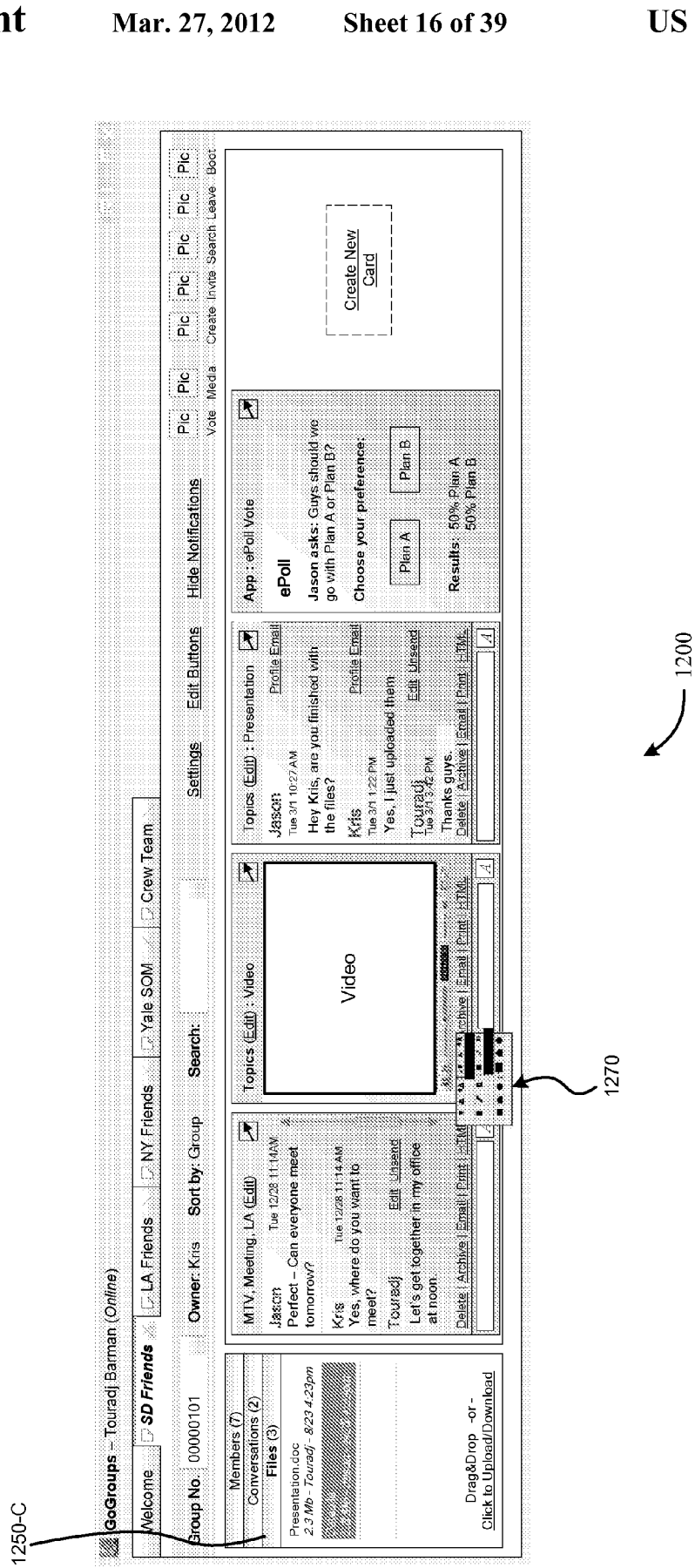

FIG. 12C show the "Files" minitab 1250-C. Files are included that may be accessed by group members within the "Files" minitab 1250-C. A user may add files by simply dragging and dropping a file icon or by clicking on the upload button. Files may be downloaded and/or opened by selecting a download button. Files may also be saved to another location on the user's computer by dragging and dropping the file from the application.

FIG. 12C also shows a text mark up window 1270 that may be used to markup text entered into a card and sent to the other group members. In this embodiment, text may be bolded, underlined, and/or italicized. The text size may be adjusted and characters may be added. Any variety of text markups may be included. The text markup window may be customized and shared to include other markup characters.

Figure 13:
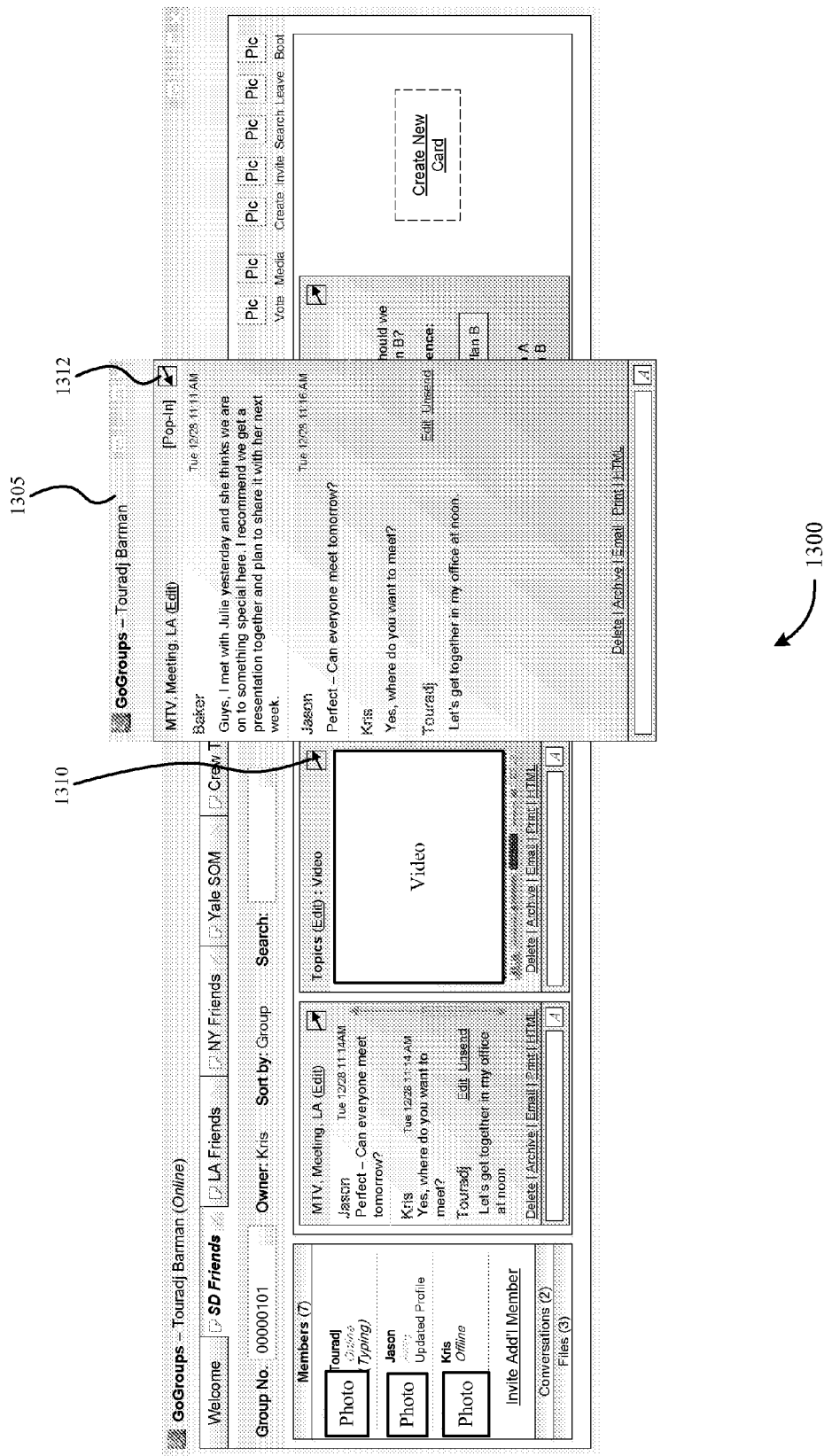
FIG. 13 shows a screenshot of a pop-out card of a group messaging application according to one embodiment of the invention.

FIG. 13 shows a screenshot 1300 of a pop-out card 1305 of a group messaging application according to one embodiment of the invention. The size of a card may be increased and popped-out into a larger individual window by selecting the pop-out button 1310. The card may be returned to its normal size and position by selecting the pop-in button 1312.

Figure 14:
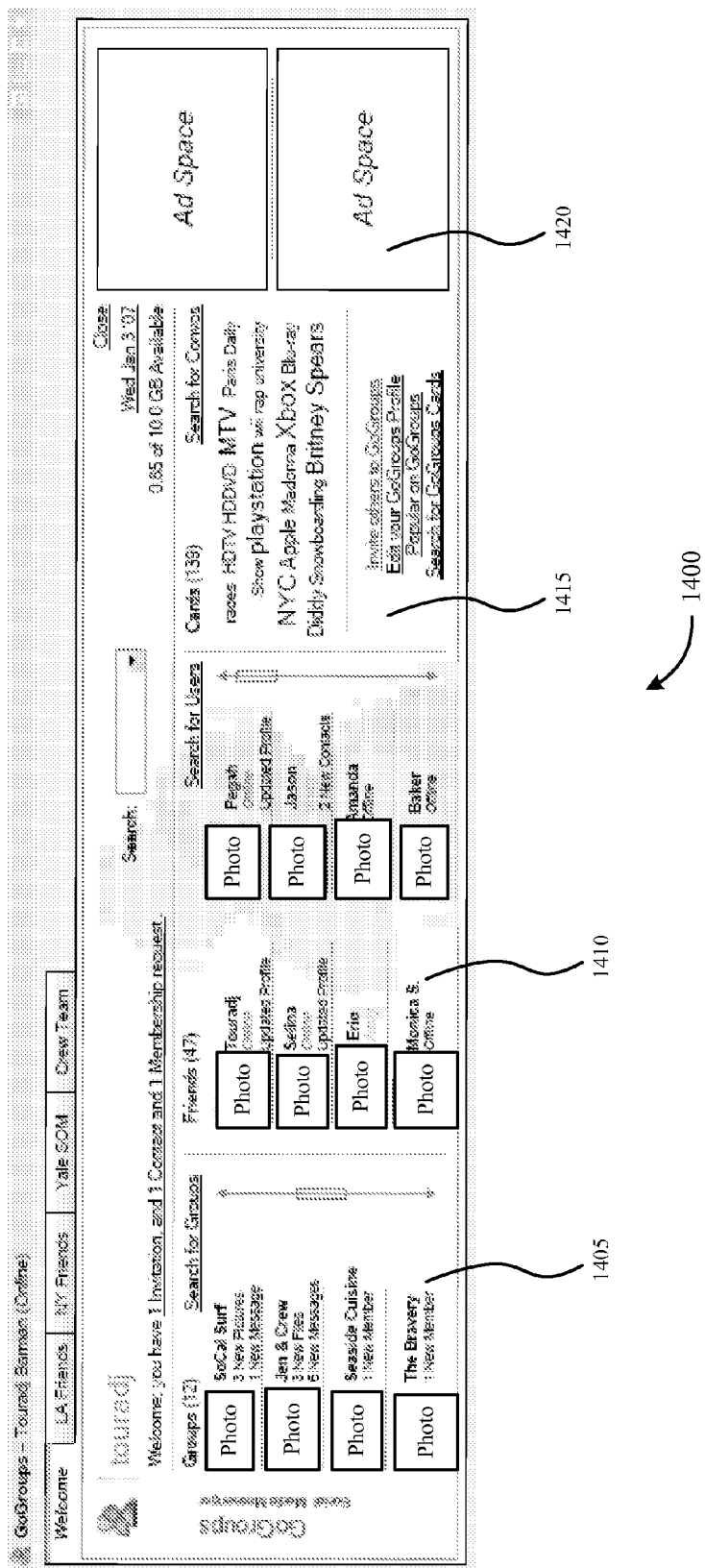
FIG. 14 shows a screenshot of a welcome screen of a group messaging application according to one embodiment of the invention.

FIG. 14 shows a screenshot 1400 of a welcome screen 1400 of a group messaging application according to one embodiment of the invention. The welcome screen is shown when the welcome tab is selected. The welcome screen 1400 includes a list of groups 1405 that the user participates in, a list of friends 1410, and a list of tags 1415 in a tag cloud. The list of tags 1415 may graphically reflect the relevance, importance or popularity of a topic. As shown, the larger the text of the topic, the more popular the term. A user interested in a topic associated with a tag may simply click on the tag and the related information may be opened in an existing card or in a new card.

Ad space 1420 may also be added to the welcome screen 1400 and/or on screens throughout the application. The ads may be topic-specific based on current information being displayed through the cards. Furthermore, as conversations progress, the ads may adapt to provide ads related to conversations. For example, if users are discussing cars through an instant messaging card ads may be displayed for cars and more specifically for cars or similar cars being discussed. As the conversation progresses, for example, the users may discuss football and the ads may change to ads for football, such as, for example, for football paraphernalia or tickets.

Figure 15:
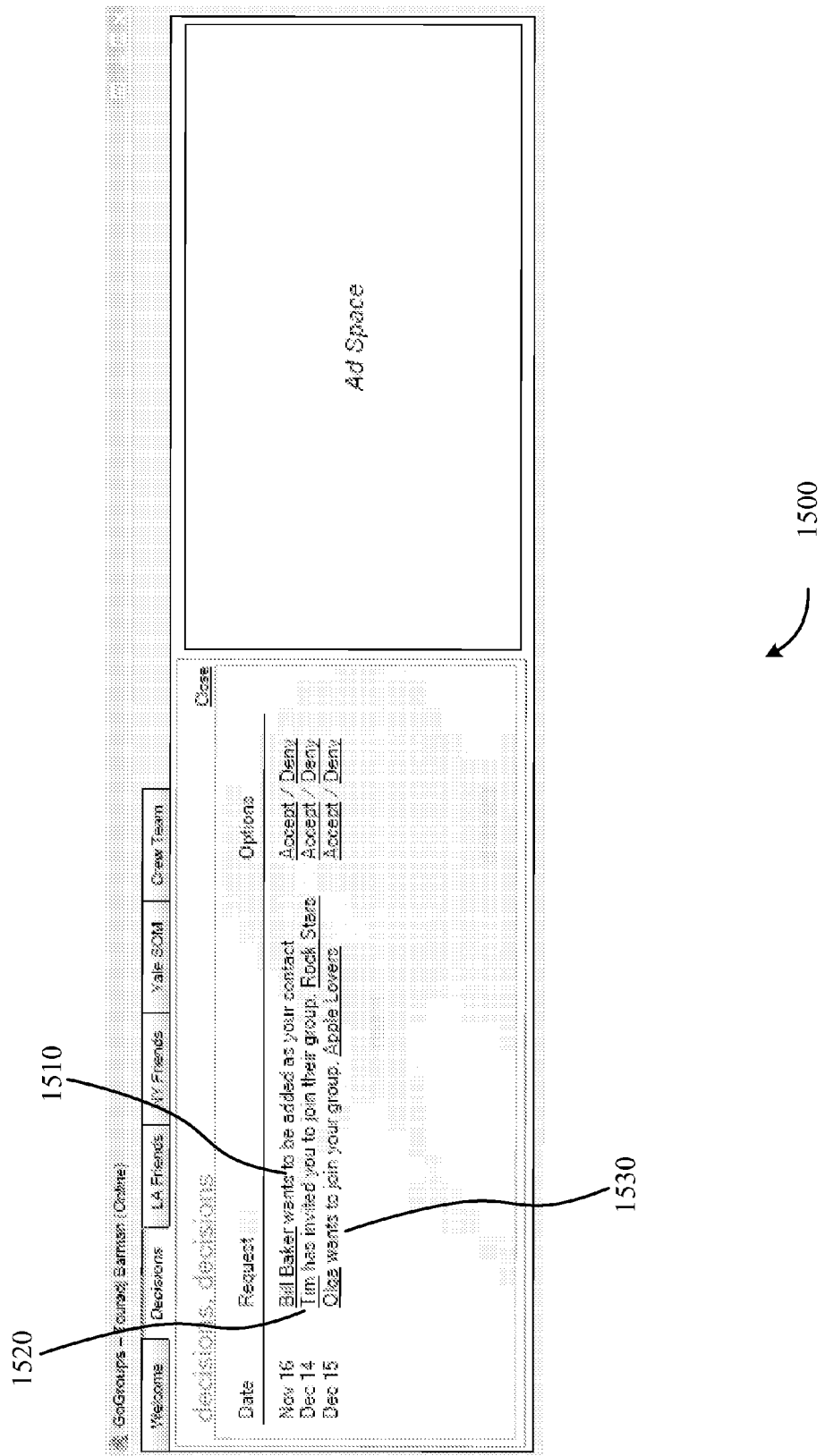
FIG. 15 shows a screenshot of a decision window of a group messaging application according to one embodiment of the invention.

FIG. 15 shows a screenshot 1500 of a decision window of a group messaging application according to one embodiment of the invention. The decision screen is shown when the decisions tab is selected. The decision window lists decisions to be made by the user. Typically, decisions revolve around joining groups or contacts. As shown, one decision is whether to let Bill Baker join the user's contacts 1510. Another example shown is that Tim has invited the user to join his group Rock Stars 1520 and the user can decide what to do (reject or accept the invitations). And, Olga wants to know if she can join the user's Apple Lovers group. Here at the decision window, the user may accept or deny these requests.

Figure 16:
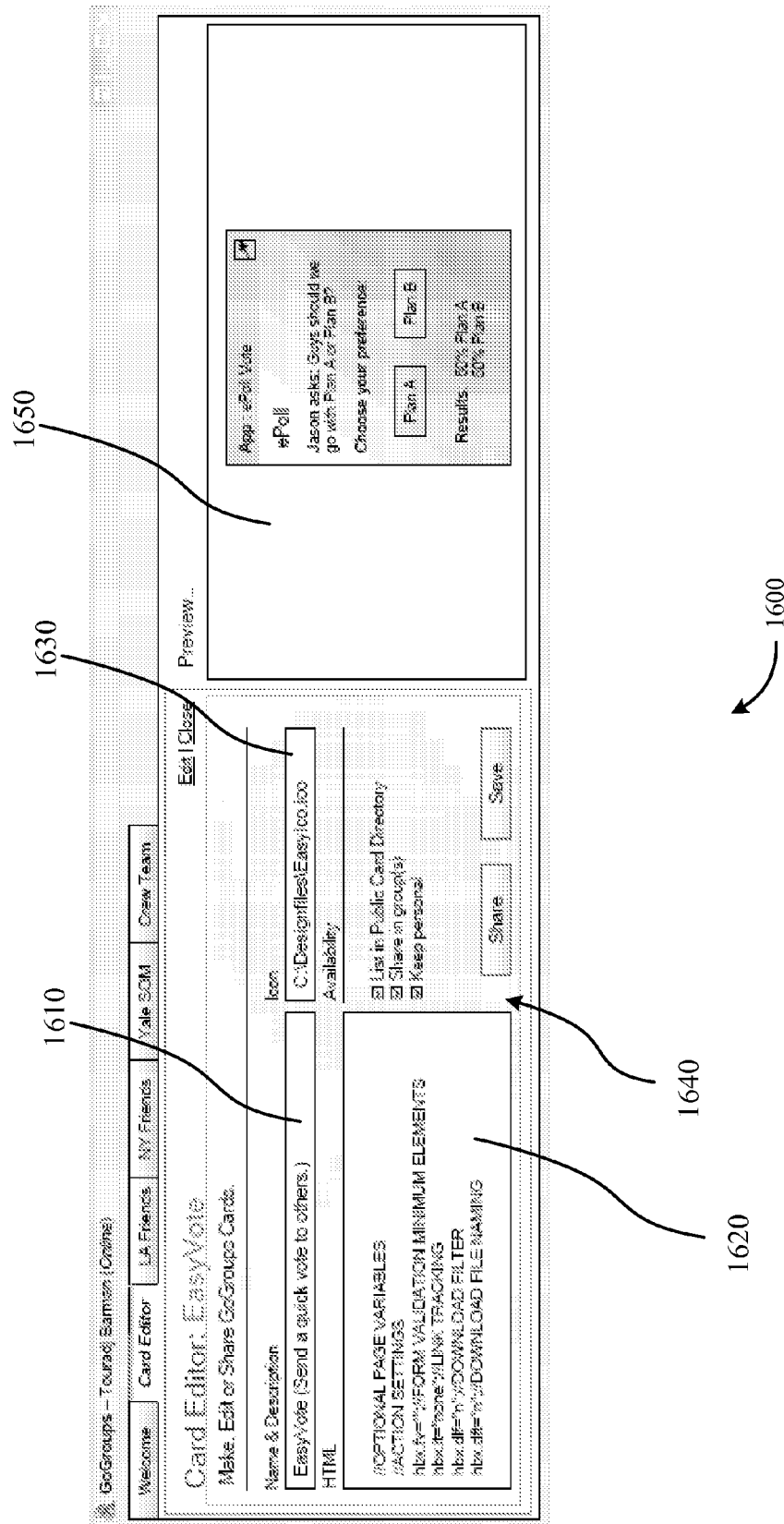
FIG. 16 shows a screenshot of a card editor of a group messaging application according to one embodiment of the invention.

FIG. 16 shows a screenshot 1600 of a card editor of a group messaging application according to one embodiment of the invention. A card editor allows users to create a customized card within a group. Cards may also be saved and used in a variety of groups. Custom cards may include HTML, XML or any other markup language to present information to a group. The card editor, in this embodiment, includes a name and description field 1610. The markup language code, in this case HTML, is editable in field 1620. An icon may be associated with the card in field 1630. Various options and settings may also used for a card editor as shown in field 1640. Cards may be made public or private, shared in a group or groups, and/or kept personal. Buttons for saving and/or sharing a card are also available. Finally, in the card editor shown, a preview of the customized card may be displayed.

In another embodiment of the invention, users may create card widgets. A card widget is a portable and specialized card that includes a chunk of code that can be opened by any user and may display the code. Card widgets may be coded in HTML as shown. The card widget may also use Flash or JavaScript. For example, a user may create a portable poll card widget for polling users. The card widget can then be saved and shared with other users. Other users may then use the card widget in various groups. Examples of card widgets may include, maps, weather pages, games, puzzles, layout, and/or other customizations. Card widgets are only bounded by the creativity of the users creating the card widgets. Also, card widgets may associated with a button on the menu bar 1260, whereupon when the button is selected the widget either pops-up into a new window or is entered as a new card within the application.

Figure 17:
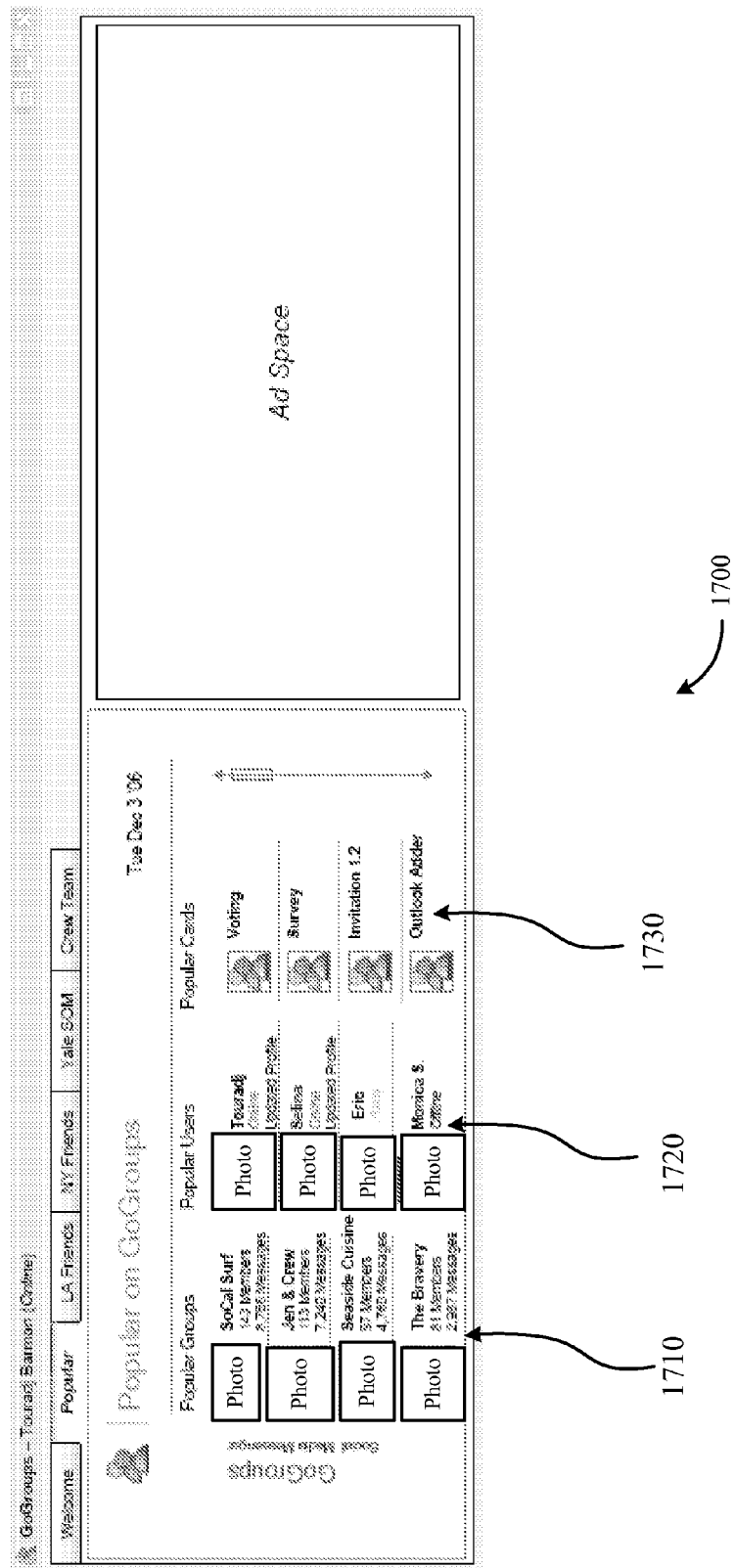
FIG. 17 shows a screenshot of a popular groups window of a group messaging application according to one embodiment of the invention.

FIG. 17 shows a screenshot 1700 of a popular groups window of a group messaging application according to one embodiment of the invention. A popular groups window may be selected by selecting a popular tab or by selecting a link. The popular groups window displays a list of popular groups

1710, users 1720 and/or cards 1730. Information related to the group, user or card may also be displayed. The group, user or card may be selected and viewed separately, if permitted depending on group membership and whether a group, card, or user information is public or private.

Figure 18A:
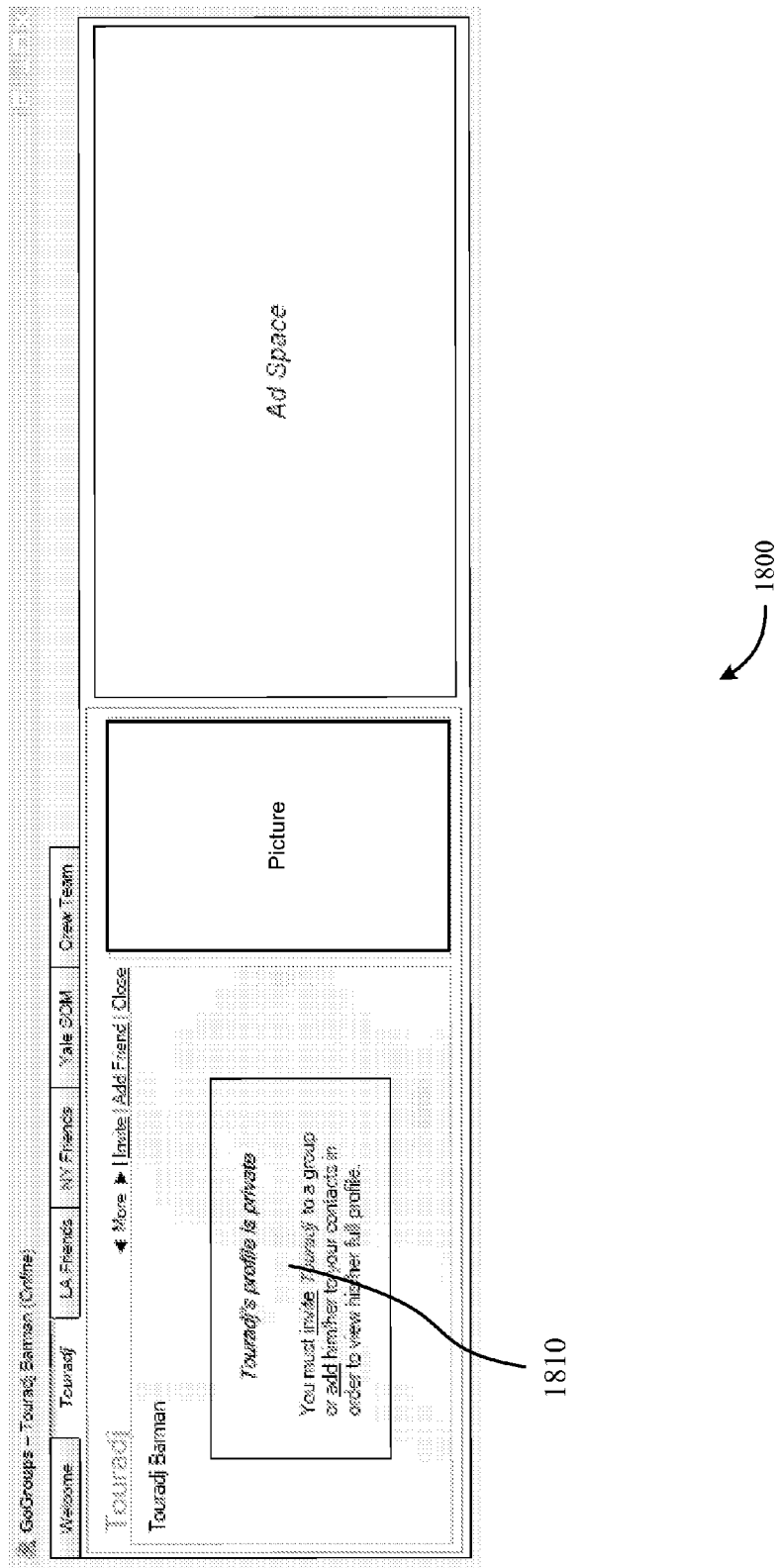
FIGS. 18A-F show screenshots of a user profile of a group messaging application according to one embodiment of the invention.
Figure 18B:
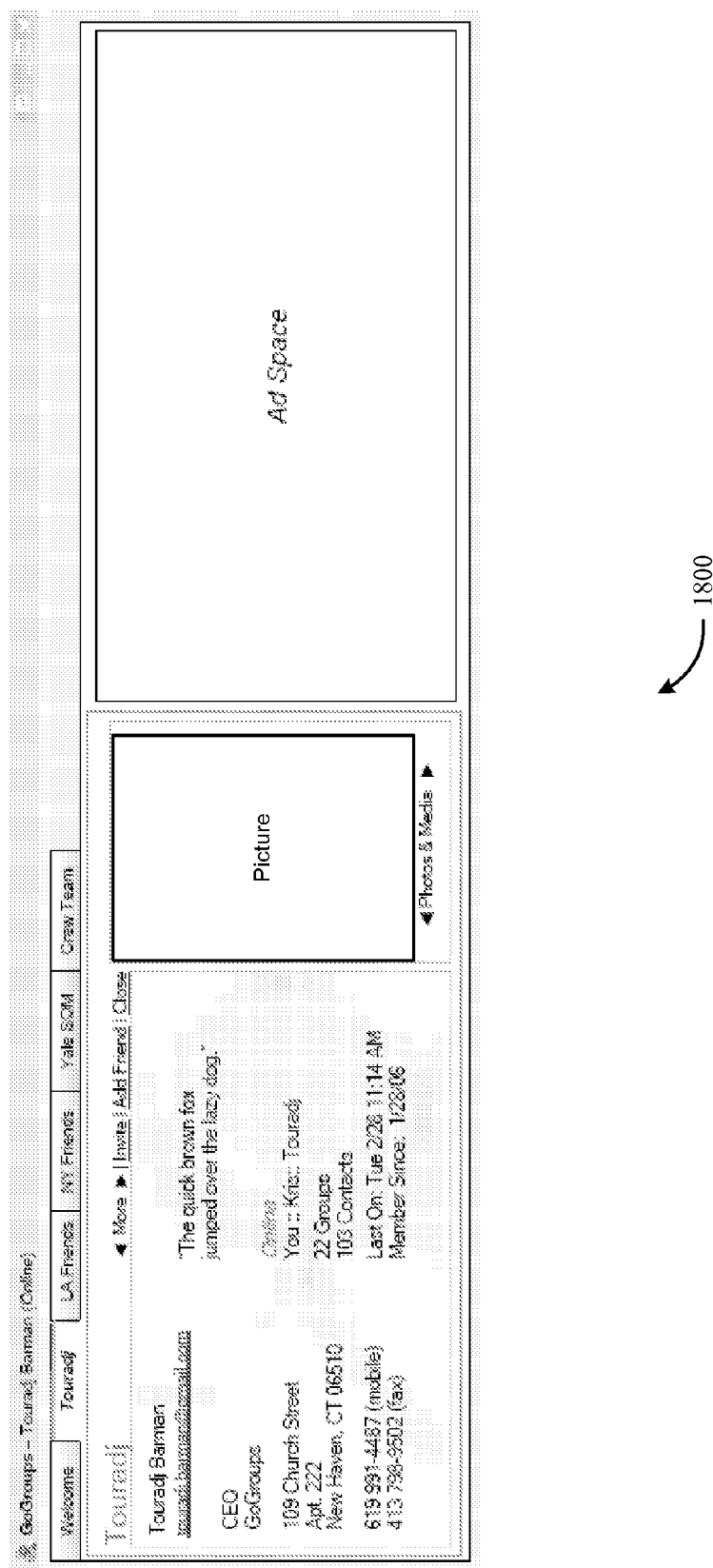
Figure 18C:
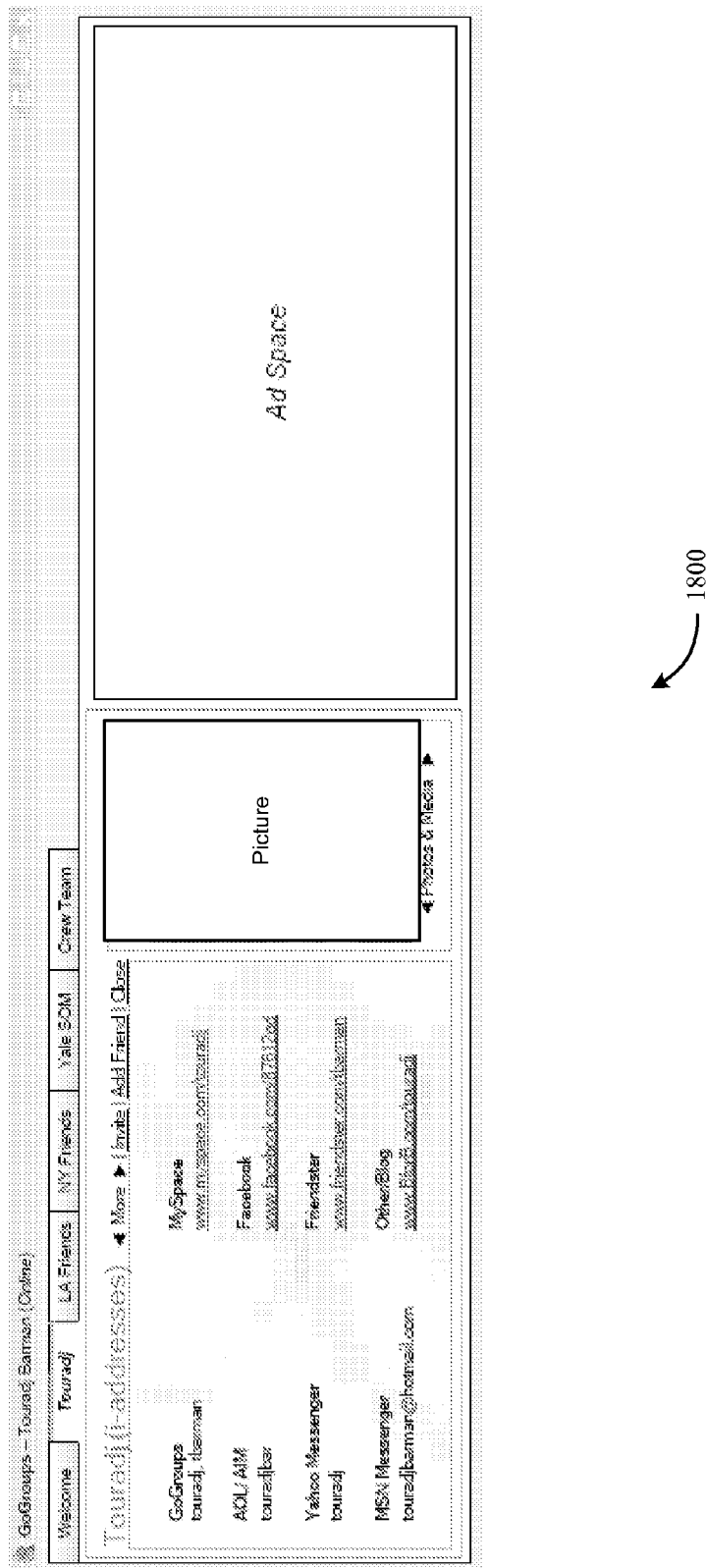
Figure 18D:
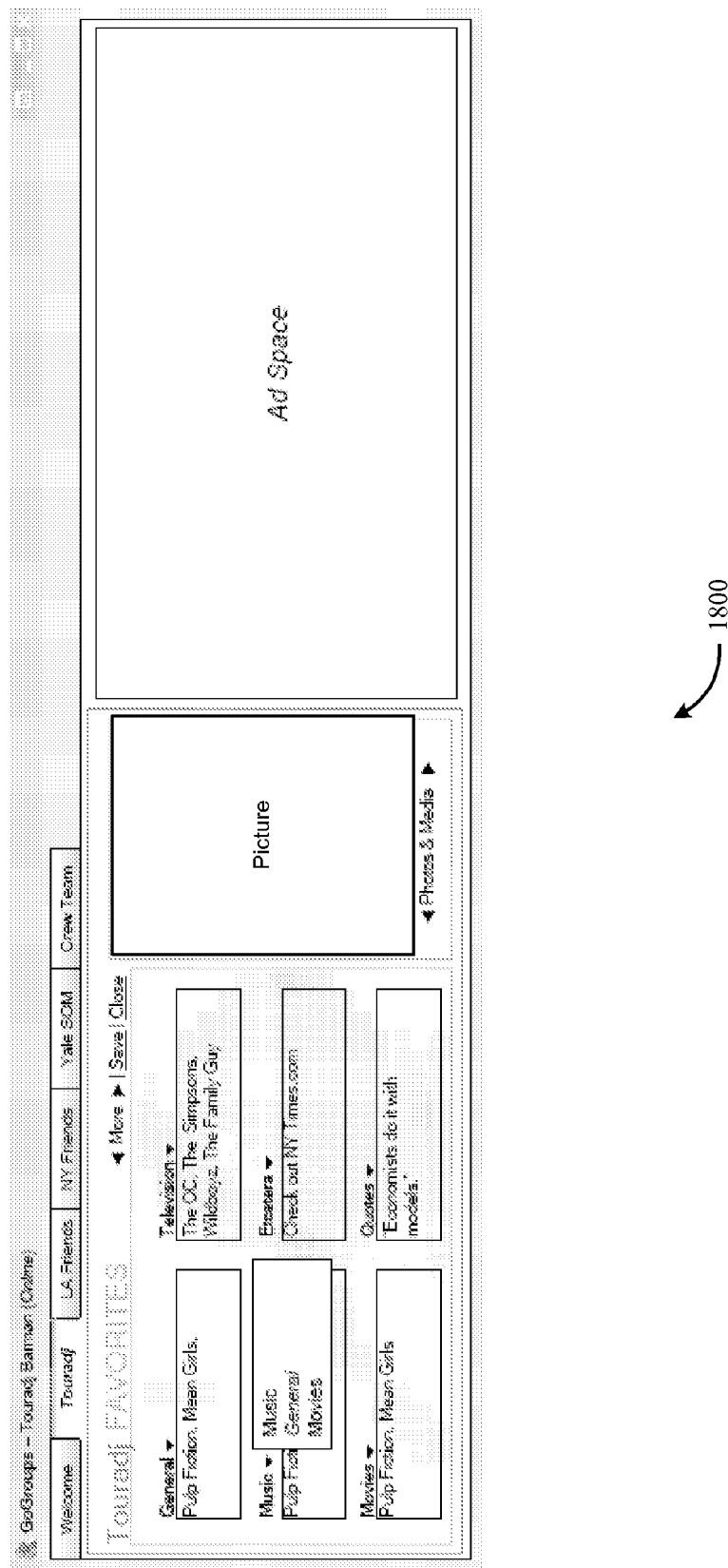
Figure 18E:
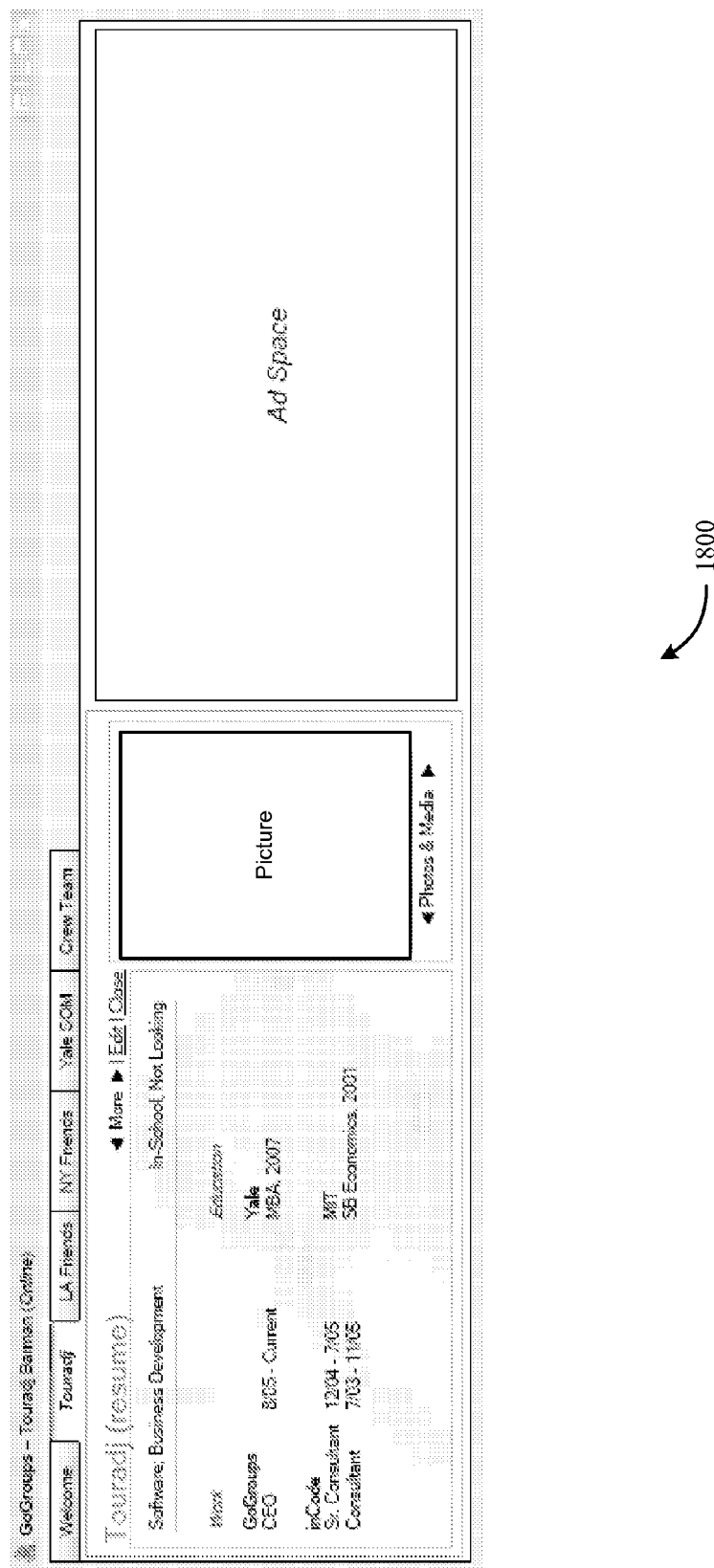
Figure 18F:
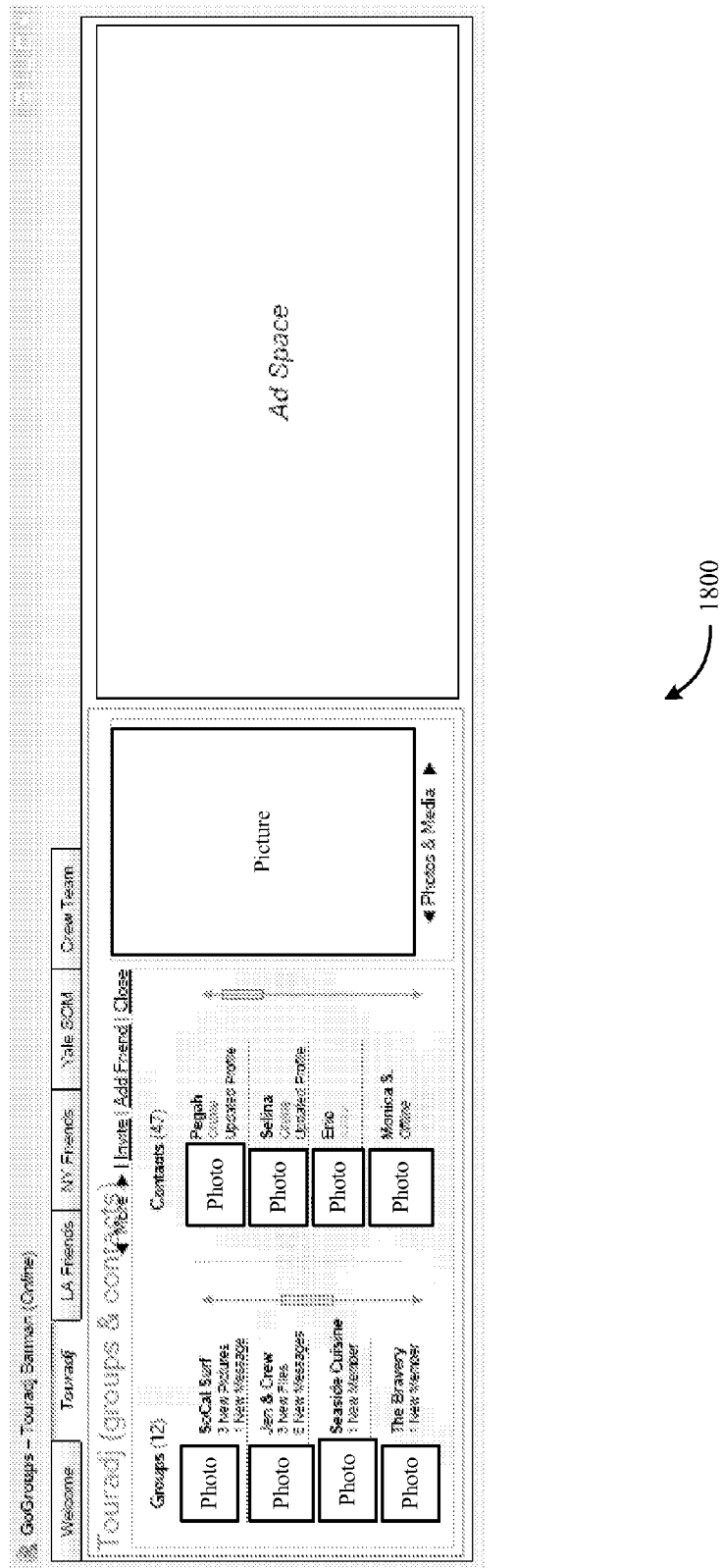

FIGS. 18A-F shows screenshots 1800 of a user profile in a group messaging application according to one embodiment of the invention. User profiles may present information about a user. A user may choose a public or private profile, or a semi-public profile. FIG. 18A shows a screen 1810 explaining a user's profile is private and that it may be viewed if the user is part of a group with the viewer and/or in the viewer's list of groups. A semi-private profile displays some information publicly and withholds other information from viewers in the users groups or contacts.

FIG. 18B-F shows an exemplary user profile pages. The user profile lists various details about a user, such as, for example, email address, photograph, address, telephone number, title, quotes, status, group and contact statistics, video, instant messaging user ids, personal web pages, favorite movies, favorite music, favorite television shows, favorite web pages, work position, employment, education, group membership and/or contacts. Of course, various other information may be presented in a user profile. Users may also modify and/or customize his user profile.

Figure 19:
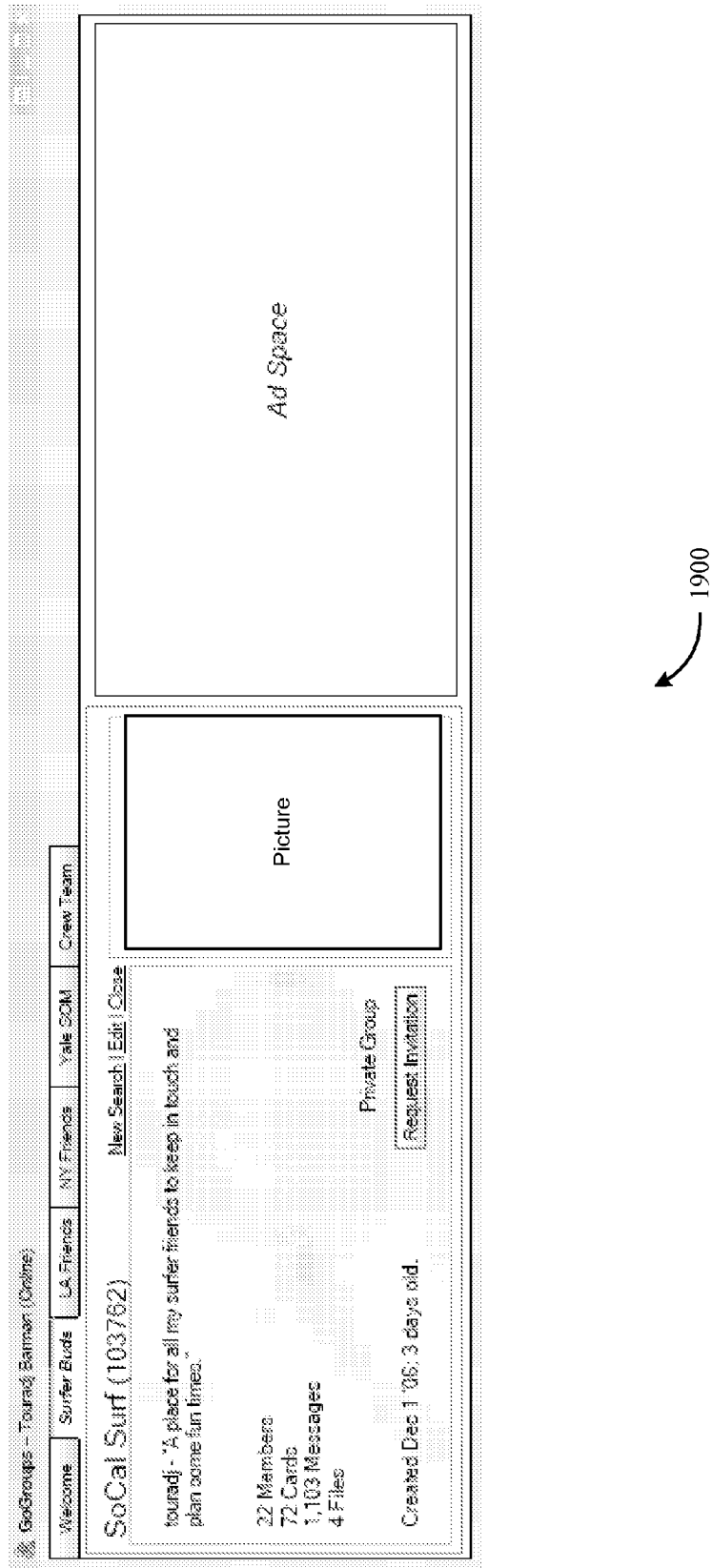
FIG. 19 shows a screenshot of a group profile of a group messaging application according to one embodiment of the invention.

FIG. 19 shows a screenshot 1900 of a group profile in a group messaging application according to one embodiment of the invention. The group profile may describe the purpose and/or association of the group. The group profile may also list group details such as number of members, number of cards, number of messages, number files, date created, creator, public and private information, related groups, etc.

Figure 20:
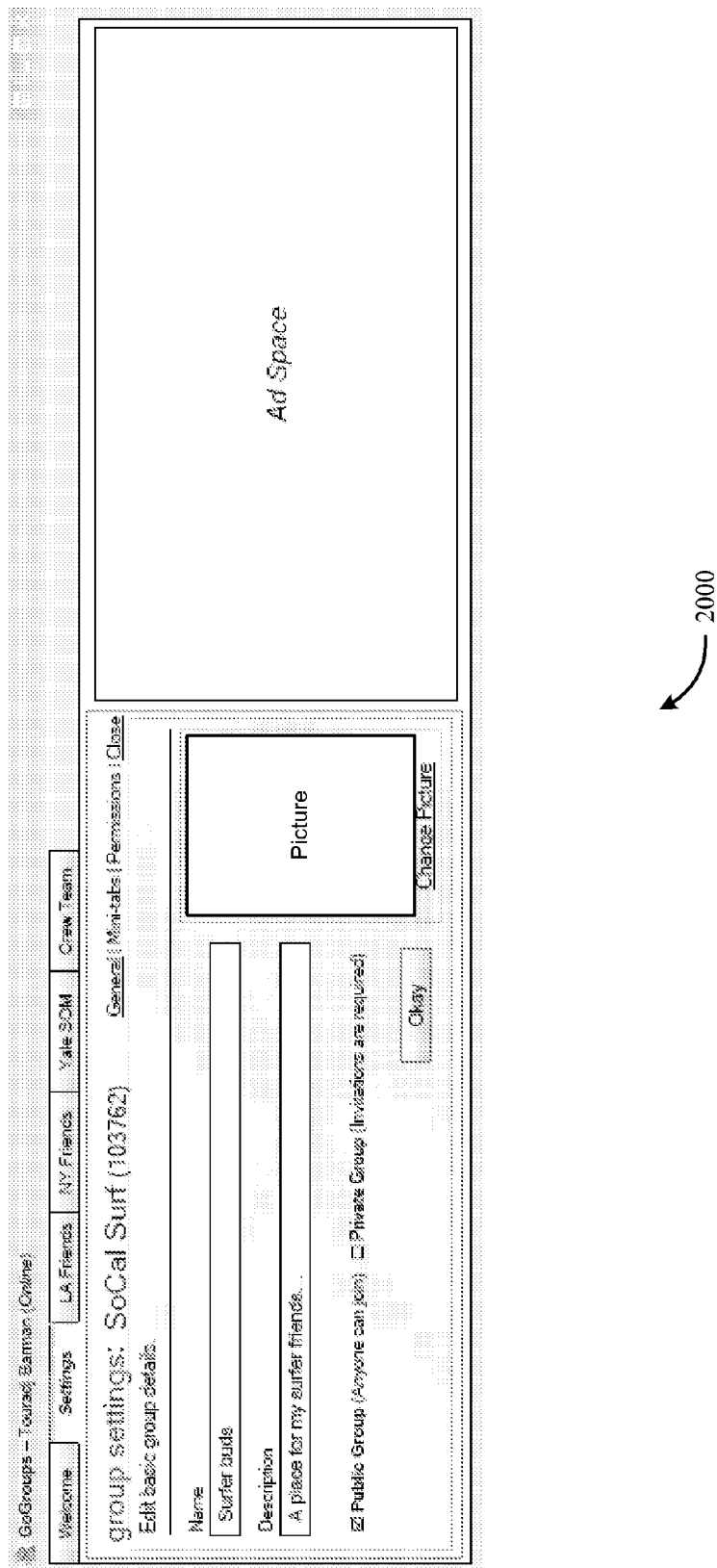
FIG. 20 shows a screenshot of group settings of a group messaging application according to one embodiment of the invention.

FIG. 20 shows a screenshot 2000 of group settings in a group messaging application according to one embodiment of the invention. Group setting such as group name, description, and whether the group is public or private may be changed. Such information may be changed only by the group owner or manager. A photograph or video may be included in the group settings.

Figure 21A:
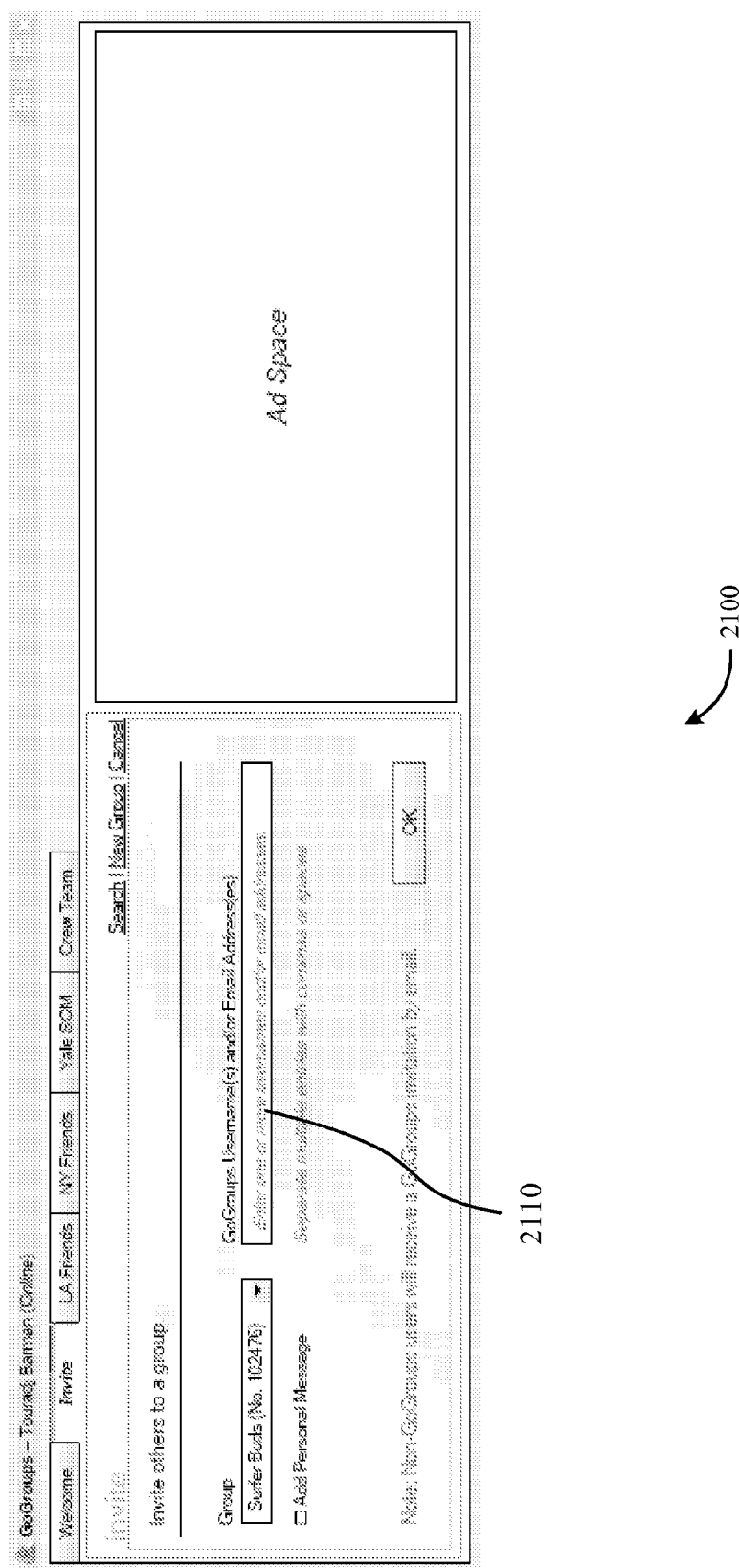
FIGS. 21A-C show screenshots of a user invitation window a group messaging application according to one embodiment of the invention.
Figure 21B:
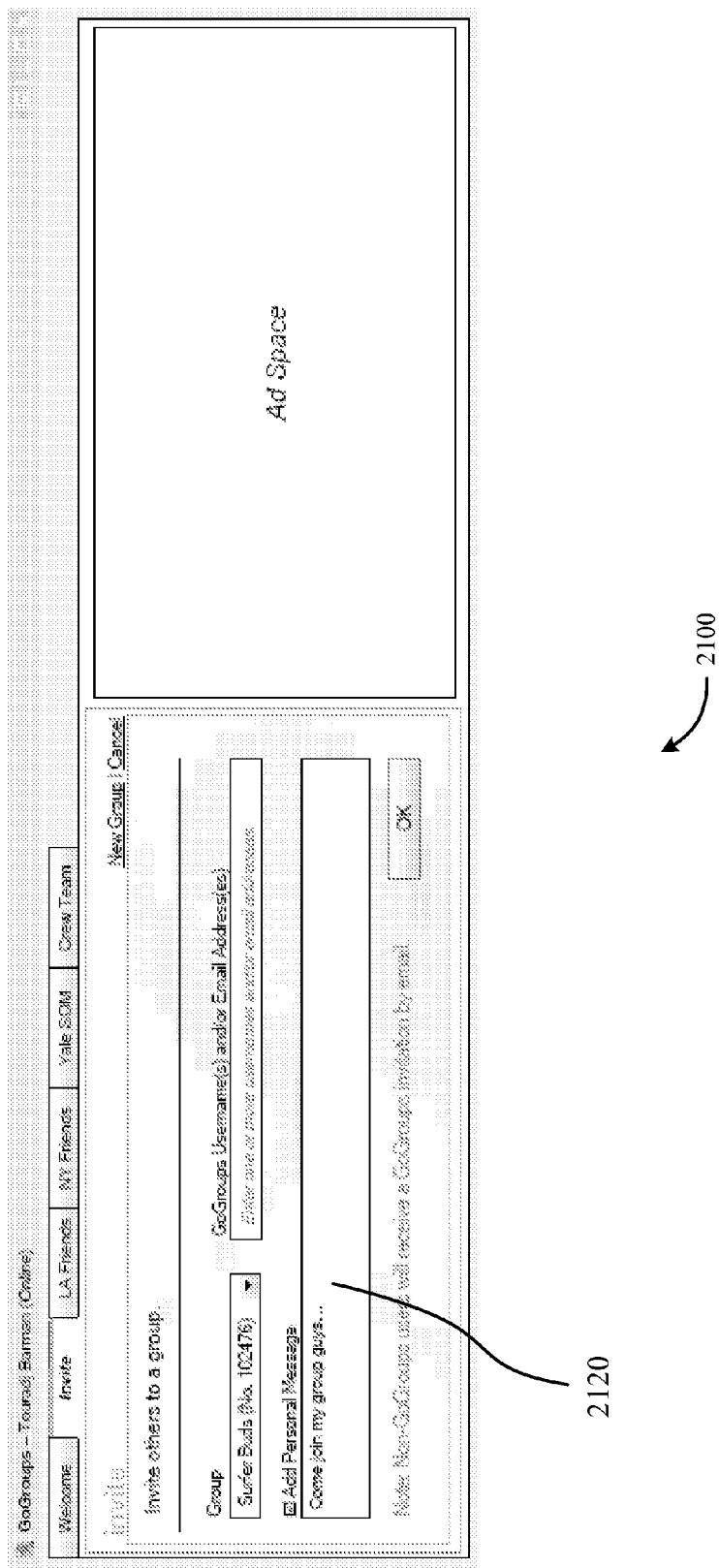
Figure 21C:
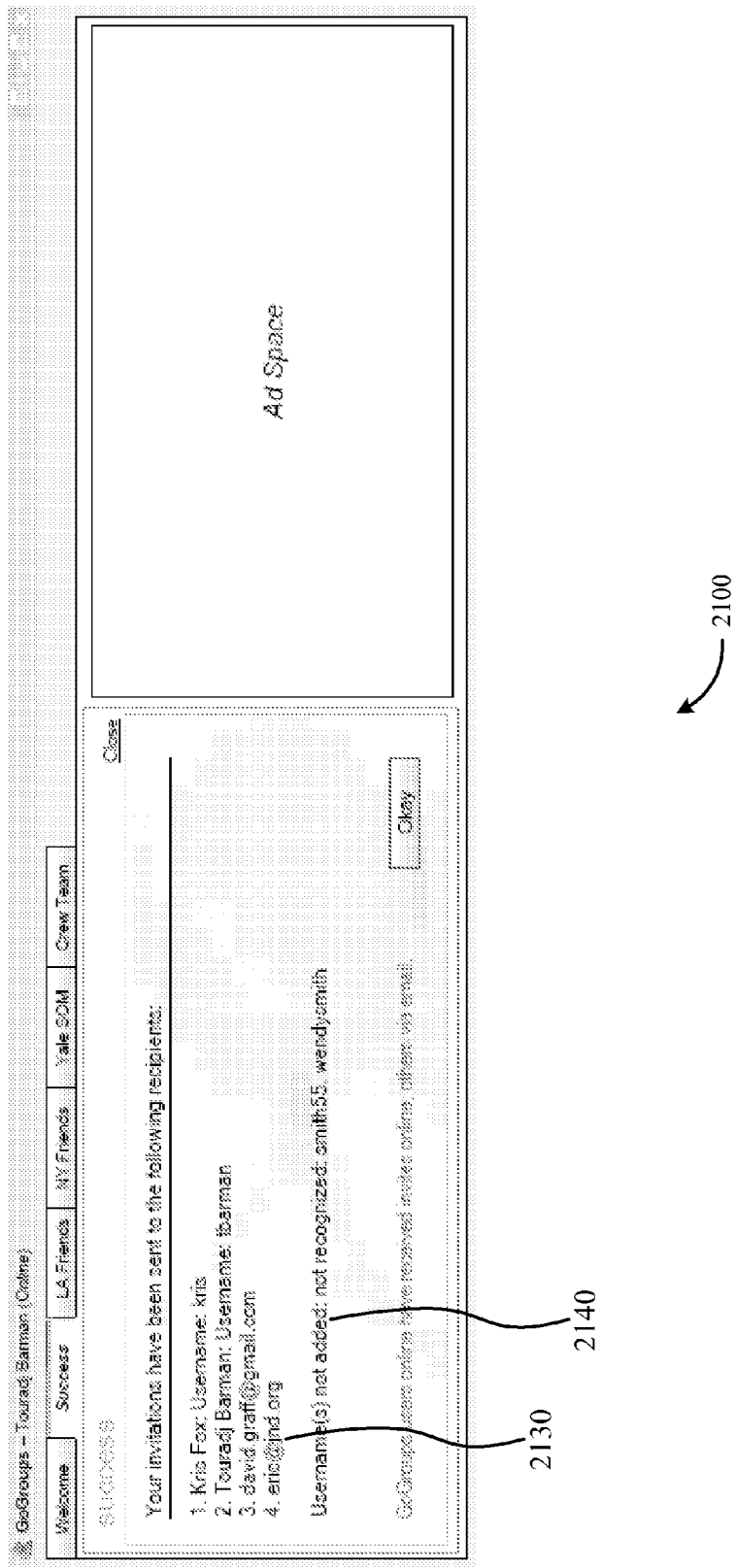

FIGS. 21A-C shows screenshots 2100 of a user invitation window in a group messaging application according to one embodiment of the invention. As shown in FIG. 21A, people may be invited to join a group by sending a message. Email address or usernames 2110 may be entered for individuals to be invited to the group. Invited individuals may then receive a message within the application or via email inviting them to join the group. FIG. 21B shows a personal message that may be included in the group invitation message. FIG. 21C shows a list of usernames and email addresses that have been invited to join the group 2130. Usernames and ids that were not recognized may also be displayed 2140.

Figure 22:
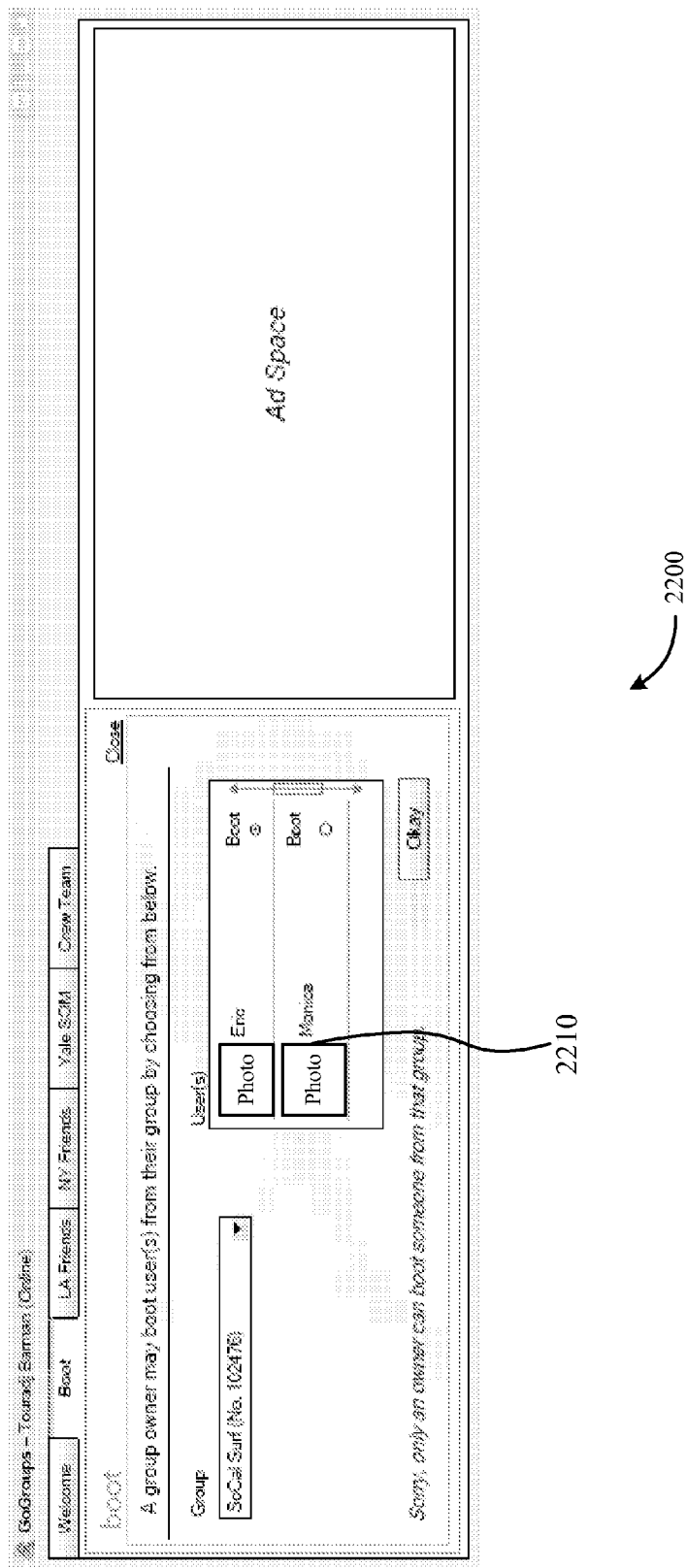
FIG. 22 shows a screenshot of group booting window of a group messaging application according to one embodiment of the invention.

FIG. 22 shows a screenshot 2200 of group booting window in a group messaging application according to one embodiment of the invention. A group owner may boot others from the group. A group owner may simply select members of the group from a list 2210 and choose to have them removed (booted) from the group. Removed members may be re-invited.

Figure 23:
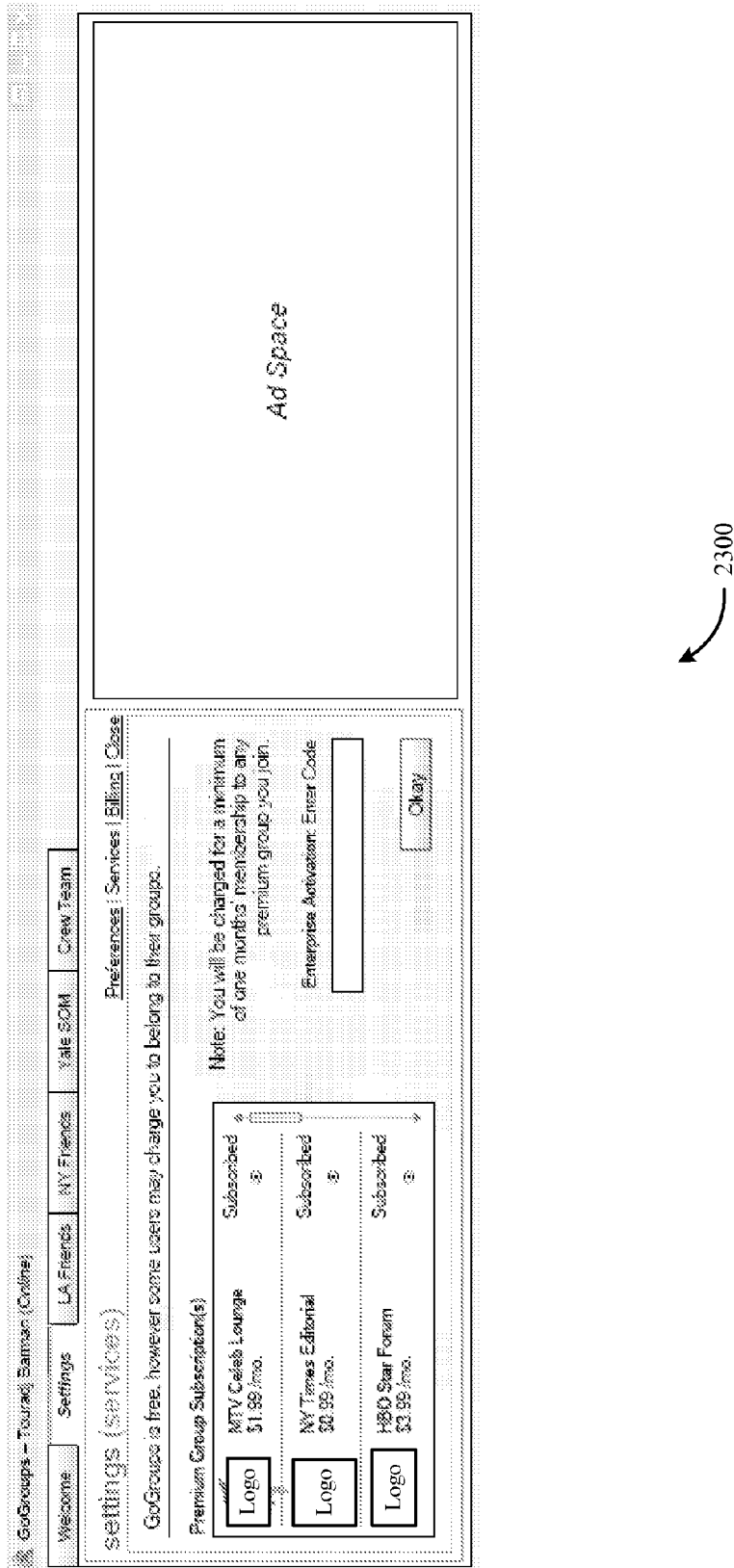
FIG. 23 shows a screenshot of a premium group settings of a messaging application according to one embodiment of the invention.

FIG. 23 shows a screenshot 2300 of premium group settings in a messaging application according to one embodiment of the invention. Premium groups may also be established that require payment for entry into the group. Newspapers, movies, televisions shows, rock bands, celebrities, etc. may create premium groups that provide premium content and interaction for users that pay for group membership. Membership may be a one time fee or a recurring fee. Premium membership may include a one time event membership.

In another embodiment of the invention a client application may store financial or payment information that may be used to pay for application services, content, premium content, widgets, card widgets, group membership, premium groups, or other Internet based transactions. Users may participate in a marketplace where goods and services may be bought and sold. User's financial and/or transaction information may be maintained by the client application and provided to financial institutions for payment of a good and/or service. The financial and/or transaction information may be saved locally on the computer where the client application is running or on a server. For example, a user may enter their credit card number and other billing information. When the user wishes to make a purchase the client application provides the relevant payment information. The user may need to provide a password or other security code to release the payment information.

Figure 24:
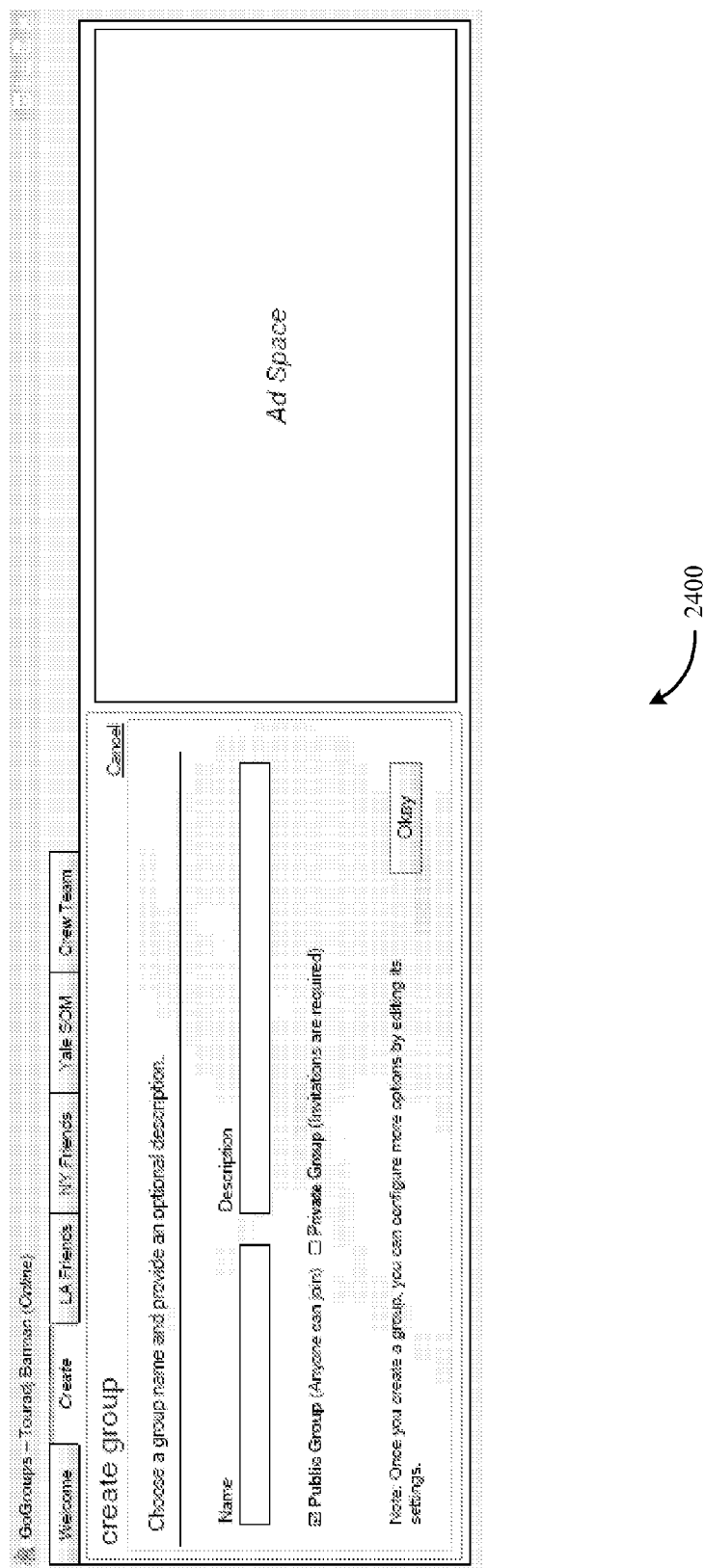
FIG. 24 shows a screenshot of a group creation window of a group messaging application according to one embodiment of the invention.

FIG. 24 shows a screenshot 2400 of a group creation window in a group messaging application according to one embodiment of the invention. A user can create groups by clicking on a "Create Group" button. The user can create a group name, add a group description, and set any number of other attributes related to that group. When a user creates a group, that user is considered the "owner" of that group. Being the owner of a group enables a user to control many aspects of that group. This includes, but is not limited to: inviting users to that group, kicking off users of that group, sharing ownership with other users, un-sharing ownership with other users, transferring ownership to other users, restricting other's functional capabilities within that group, etc. If desired, a group can be set up such that everyone in the group is an owner of the group or more than one person is an owner of a group.

Figure 25A:
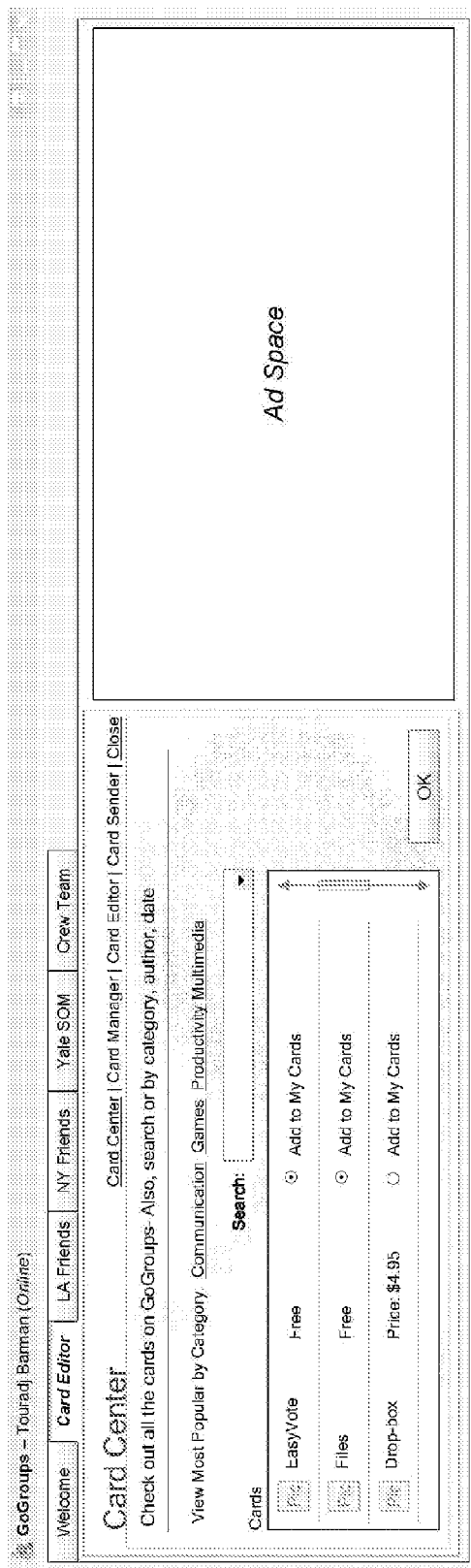
FIGS. 25A-D show screenshots of card management, editing and sharing according to one embodiment of the invention.

FIGS. 25A-D show various features of the embodiments described in FIGS. 11A-11C according to one embodiment of the invention. FIG. 25A shows a screenshot of a card editor. The card editor provides a user a way of selecting pre-designed cards for use in their application and for sharing amongst their groups. These cards may include card widgets. Some cards may require a fee to use. A search function provides users a way to find various types of cards.

Figure 25B:
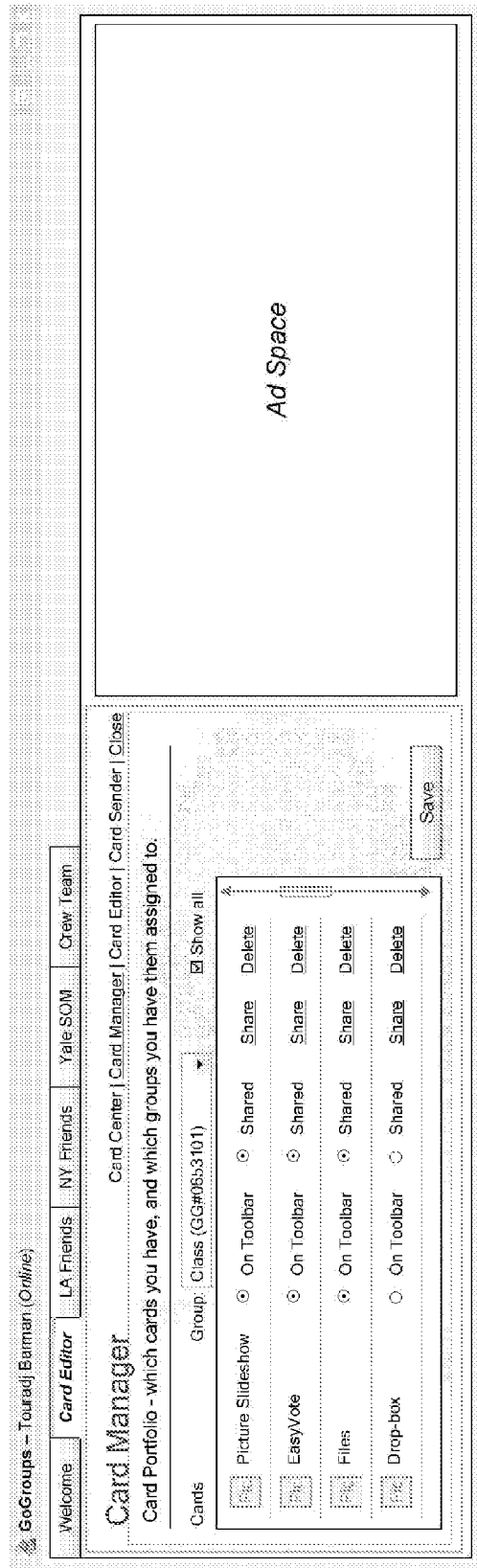

FIG. 25B shows a screenshot of card management according to one embodiment of the invention. A user may view the active cards in their groups and where the cards are placed. Various settings may be included in this view. Cards may be on the toolbar. Cards may be shared or deleted.

Figure 25C:
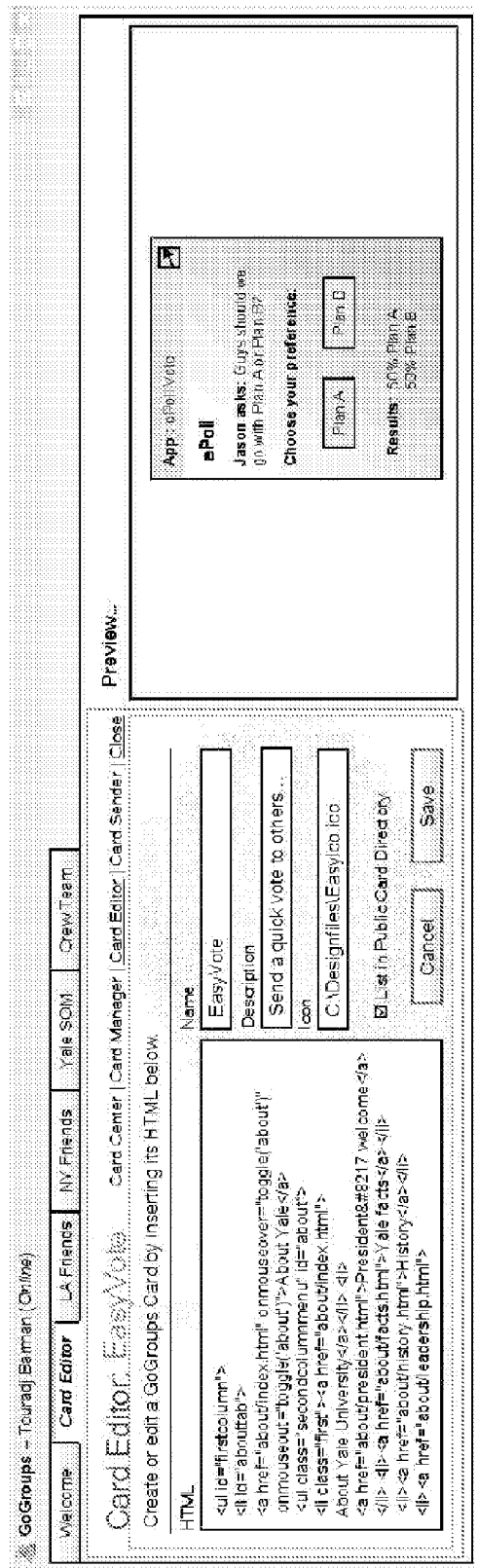

FIG. 25C shows a screenshot of how a user may edit the HTML code of a card according to one embodiment of the invention. A card name and description may be entered, and a card icon may be selected The user may also be able to chose whether the card is listed publicly or not.

Figure 25D:
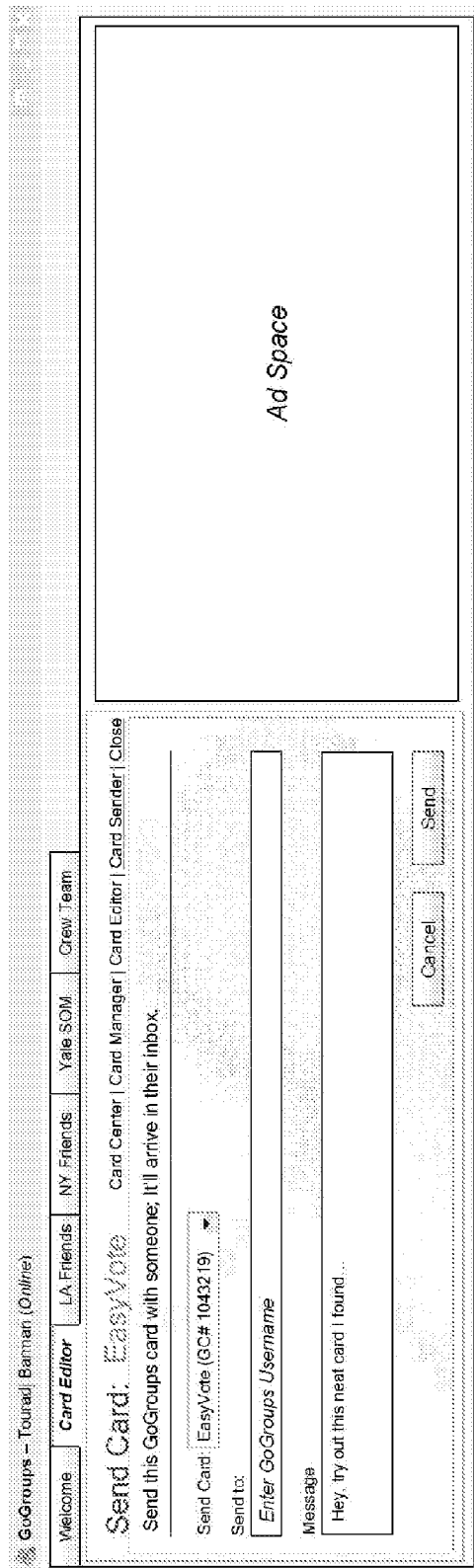

FIG. 25D shows a screenshot of how to send a card to groups or individuals according to one embodiment of the invention.

In another embodiment of the invention, group information persists at a server. Accordingly, a user may use a group messaging application at any computer by logging into their account. The application may query the group list database at the server and the groups within which the user is a member are opened within the application.

In another embodiment of the invention, messages persist at a server. Accordingly, a user may review past messages within a group. Complete conversations and cards persist at the server and are sent to the IM application. Furthermore, IM application settings also persist at the server. When a user logs into an IM application, the IM application queries the server for updated conversations, messages, and other group data that persists at the server.

Group membership and access to group messages and/or content persist on a server. Membership in a group is maintained beyond a single online session. Group messages and content also persist on a server.

Messages are also persistent. Messages remain in place even if a user logs off the network and then logs back into the network. Logging in and out, moving from online to offline mode, or any other similar activity does not cause messages to go away. Messages can only go away when they are manually deleted or otherwise automatically deleted as with normal messaging handling rules of the system. However, logging in and out of the system, again, or moving from online to offline mode or vice-versa does not cause messages to go away. Messages can be stored on the hard drive and refreshed upon each time there is an active connection to the network. Similarly, messages can be stored chiefly on the server. Messages can be stored in other ways as well.

Users can send messages to groups via standard email according to one embodiment of the invention. A user can send messages to a group by sending the message via email to an address such as, for example, owner.group@gogroups.com, group.owner@gogroups.com and/or group#@gogroups.com. Owner in this case is the screen name of the group owner, and group is either the group name or the group number that the owner owns. If these match a group that exists and people belong to, then the message may appear in the group as do other messages. There may be a notation on that message that it arrived by email. If the groups is a private group, that is a group that only allows messages from approved group members, the application may forward the message to the group only if the email address from the sender matches an email address in the group member list. Otherwise, the application may not send the message to the group. The message may appear in an instant messaging card, a group email message card, and/or sent to each group member's email address.

Similarly, a user can setup their preferences to have messages delivered to particular groups forwarded to an email address based on certain definable events. When these messages are received by email, the user can reply to them and have their response delivered to the group to appear as a message. There may be a notation on that message that it arrived by email. The user can also have messages delivered to a portable device such as a mobile phone using SMS. Users may also respond and send messages to the group from a mobile device using SMS. A notation may also be included that the message arrived from a mobile device using SMS.

Cellular phones and personal digital assistants (PDAs) can send messages to a group by sending a message to an appropriate number with or without a designated code to indicate to which group the message should be sent. Other designators may be used to specify the card within a group where the message should be displayed. Such messages may contain text, images, video, audio and/or any other data, including data describing certain attributes of the data, such as the location (in latitude/longitude or other form), time and/or other details of from where, when, how and by whom it was sent. Once received, the message may appear in the designated group as do other messages. There may be a notation on that message that it arrived by cellular phone or other wireless device.

Similarly, a user can setup their preferences to have messages sent to particular groups forwarded to a wireless device. These messages can be sent via SMS, MMS, WAP, Internet, or any other transmission method. Messages may also be received from a wireless device with SMS, MMS, WAP, Internet, or any other transmission method.

In another embodiment of the invention, users can click on a button within a group to initiate a voice and or video conversation that may be accessible and shared with everyone else belonging to that group. Voice and/or video shared with members of a group can be live or recorded and may persist on the server.

Families can be established. Families are groups of users that want to be united in unique ways for any number of reasons. For example, a family can be established such that only users belonging to that family can communicate with each other. Families can then en masse be enabled to communicate with other families or with users not in families or users in the pubic family at once. Families can also be established so that certain families can share access to certain features or customizations.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

In yet another embodiment of the invention, voice over IP (VOIP) functionality may also be included. The JABBER server and JABBER clients may include VOIP functionality using the Jingle protocol over an open connection. Real time transport protocol (RTTP) may also be used. In another embodiment of the invention, a client application running on a computer with a webcam may send live video to a group through the JABBER client.

As used throughout the terms markup language, HTML and XML include any information that may be included in a web page. For example, the terms may include data such as text, images, videos, audio, as well as markup language coding that describes the structure or presentation of the information in the data. Various types of markup languages may be used besides XML and HTML.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A network communication method at a client, wherein the client includes at least a first file, comprising:
    establishing a first and second connection between the client and a server, wherein the first connection comprises an open connection that utilizes an instant messaging protocol and the connections are not necessarily established at the same time;
    receiving a persistent message pushed from the server through the first connection, wherein the first message instructs the client to request first update data from the server through the second network connection, wherein the persistent message is generated in response to receiving the first update data and the persistent message instructs the client that first update data is available for the first HTML file at the server, wherein the persistent message is only pushed from the server in response to the server receiving the first update data;
    automatically requesting the first update data from the server through the second connection in response to the instructions in the persistent message; and
    updating the first file with the first update data received from the server.

2. The network communication method of claim 1, further comprising displaying the first file to a user through a user interface.

3. The network communication method of claim 1, wherein the message is received from the server substantially instantaneously after the updated file is updated.

4. The network communication method of claim 1, wherein the first connection is a JABBER connection.

5. The network communication method of claim 1, wherein the second connection is an HTTP connection and the file comprises HTML.

6. The network communication method of claim 1, wherein the first file comprises a markup language.

7. The network communication method of claim 1, wherein the first connection is a JABBER connection, the second connection is an HTTP connection, and the file comprises HTML, and the server comprises an HTTP server and a JABBER server.

8. The network communication method of claim 1, further comprising:
    receiving second update data through a user interface; and
    updating the first file with the second update data.

9. The network communication method of claim 8, further comprising sending the first file to the server through the first connection.

10. The network communication method of claim 8, further comprising sending the second update data to the server through the second connection.

11. The network communication method of claim 8, further comprising converting the second update data into a markup language.

12. The network communication method of claim 8, further comprising displaying the first file to a user through the user interface.

13. A network communication method at a server, wherein the server includes at least a first HTML file, the method comprising:
    establishing a first connection between a first client and the server, wherein the first connection utilizes an instant messaging protocol;
    receiving first update data from the first client through the first connection and updating the first HTML file with the first update data;
    generating a persistent message in response to receiving the first update data, wherein the persistent message instructs the client that first update data is available for the first HTML file at the server;
    establishing a second and a third connection between a second client and the server, wherein the second connection is an open connection that utilizes an instant messaging protocol and wherein the third connection is different than the first connection and the second connection;
    automatically pushing the persistent message to the second client through the second connection in response to receiving the first update data, and wherein the persistent message is only pushed from the server in response to the server receiving the first update data;
    receiving a message from the second client through the third connection, wherein the message requests that the server send the first update file; and sending the first update file through the third connection to the client.

14. The network communication method of claim 13, wherein the server comprises a JABBER server and an HTTP server.

15. The network communication method of claim 13, further comprising:
    establishing a plurality of second and third connections between the server and each of a plurality of clients, wherein the plurality of first connections are open connections and the connections are not necessarily established at the same time;
    sending a message to each of the plurality of clients through each of the plurality of second connections, wherein the message tells each of the plurality of clients that first update data is available at the server;
    receiving a message from at least one of the plurality of clients through at least one of the plurality of third connection, wherein the message requests that the server send the first update file; and
    sending the first update file through the third connection to each of the plurality of clients that sent a message to the server.

16. A network communication method at a server, the method comprising:
    maintaining a first group list at the server, wherein the first group list comprises a list of more than one client, wherein the list of more than one client comprises at least a first client;
    maintaining at least a first HTML file at the server;
    establishing a plurality of first connections between the server and a plurality of clients, wherein the plurality of clients comprise at least the first client, and wherein the first connection utilizes an instant messaging protocol;
    sending the first file to the clients in the first group;
    establishing a plurality of second connections between the server and the plurality of clients, wherein the plurality of second connections utilize an instant messaging protocol;
    receiving a first persistent message from the first client, wherein the first persistent message comprises an addendum to the first HTML file, and the first persistent message specifies that the message is intended for clients in the first group;
    appending the first file with the first persistent message;
    determining which of the plurality of clients with a second connection are in the first group list;
    generating a second persistent message in response to receiving the first persistent message, wherein the second persistent message indicates that the first file has been appended, wherein the second persistent message is generated in response to receiving the first persistent message and the second persistent message instructs the client to download the first HTML file with addendum;
    in response to the determining, pushing the second persistent message to at least one client from the plurality of clients in the first group list through the plurality of second connections, wherein the second persistent message is only pushed from the server in response to the server receiving the first persistent message;
    establishing a third connection between the server and a second client, wherein the third connection is an open connection;
    determining whether the second client is in the first group; and
    if the second client is in the first group, sending the appended first file to the second client through the third connection.

* * * * *

UNITED STATES PATENT AND TRADEMARK OFFICE
CERTIFICATE OF CORRECTION

PATENT NO.          : 8,145,719 B2
APPLICATION NO.     : 11/681507
DATED               : March 27, 2012
INVENTOR(S)         : Touradj Barman and Kristofer Fox Page 1 of 2

It is certified that error appears in the above-identified patent and that said Letters Patent is hereby corrected as shown below:

IN THE CLAIMS

COLUMN 19
Claim 1: Line 53: Delete "first and second" and insert --first connection and a second--.
Claim 1; Line 56: After "the" and before "connections" insert --first and second--.
Claim 1: Line 59: Delete "first message" and insert --persistent message--.
Claim 1: Line 61: After "second" and before "connection" delete "network".
Claim 1: Line 65: After "first" and before "file" delete "HTML".

COLUMN 20
Claim 3: Line 11: After "the" and before "message" insert --persisent--.
Claim 3: Line 12: Delete "updated file" and insert --first file--.

Claim 5: Line 16: After "the" and before "file" insert --first--.

Claim 7: Line 22: After "the" and before "file" insert --first--.

Claim 13: Line 52: Delete "instructs the client" and insert --instructs a client--.
Claim 13: Line 54: After "second" and before "and" insert --connection--.
Claim 13: Line 67: Delete "file; and" and insert --data; and--.

COLUMN 21
Claim 13: Line 1: Delete "update file" and insert --update data--.
Claim 13: Line 2: After "the" and before "client" insert --second--.

Claim 15: Line 9: Delete "wherein the" and insert --wherein a--.
Claim 15: Line 12: After "a" and before "message" insert --second--.
Claim 15: Line 14: After "the" and before "message" insert --second--.
Claim 15: Line 16: After "a" and before "message" insert --third--.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,145,719 B2

COLUMN 21
Claim 15: Line 19: Delete "file; and" and insert --data; and--.
Claim 15: Line 20: Delete "update file" and insert --update data--.
Claim 15: Line 21: Delete "sent a" and insert --sent the third--.

Claim 16: Line 34: Delete "first file to the clents in the first group;" and insert --first HTML file to clients in the first group list;--.

COLUMN 22
Claim 16: Line 8: Delete "the message is intended for clients" and insert --the first persistent message is intended for the clients--.
Claim 16: Line 9: Delete "group;" and insert --group list;--.
Claim 16: Line 10: After "first" and before "file" insert --HTML--.
Claim 16: Line 15: After "first" and before "file" insert --HTML--.
Claim 16: Line 18: Delete "instructs the" and insert --instructs a--.
Claim 16: Line 29: Delete "group; and" and insert --group list; and--.
Claim 16: Line 31: Delete "group, sending" and insert --group list, sending--.
Claim 16: Line 32: After "first" and before "file" insert --HTML--.